(12) United States Patent
Hanne

(10) Patent No.: US 8,599,340 B2
(45) Date of Patent: Dec. 3, 2013

(54) LIQUID CRYSTAL DISPLAY DEVICE HAVING WIDE VIEWING ANGLE

(71) Applicant: LG Display Co., Ltd., Seoul (KR)

(72) Inventor: Jeung-phill Hanne, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/851,602

(22) Filed: Mar. 27, 2013

(65) Prior Publication Data

US 2013/0235307 A1   Sep. 12, 2013

Related U.S. Application Data

(62) Division of application No. 12/654,587, filed on Dec. 23, 2009, now Pat. No. 8,427,609.

(30) Foreign Application Priority Data

Dec. 24, 2008 (KR) .......... 10-2008-0133974
Dec. 24, 2008 (KR) .......... 10-2008-0133975

(51) Int. Cl.
*G02F 1/1335* (2006.01)

(52) U.S. Cl.
USPC ............. 349/118; 349/96; 349/117; 349/119; 349/120

(58) Field of Classification Search
USPC .............................. 349/96, 117–120; 359/499
See application file for complete search history.

(56) References Cited

U.S. PATENT DOCUMENTS

| | | | |
|---|---|---|---|
| 2005/0110933 A1 | 5/2005 | Jeon et al. | |
| 2005/0200792 A1 | 9/2005 | Jeon et al. | |
| 2006/0244884 A1* | 11/2006 | Jeon et al. | 349/119 |
| 2007/0024792 A1 | 2/2007 | Chang et al. | |
| 2009/0115944 A1* | 5/2009 | Jeon et al. | 349/96 |
| 2009/0219472 A1* | 9/2009 | Fujita et al. | 349/114 |
| 2009/0231528 A1* | 9/2009 | Nakano et al. | 349/118 |
| 2010/0171916 A1* | 7/2010 | Mazaki et al. | 349/127 |

* cited by examiner

*Primary Examiner* — Edward Glick
*Assistant Examiner* — Sang V Nguyen
(74) *Attorney, Agent, or Firm* — McKenna Long & Aldridge, LLP

(57) ABSTRACT

Disclosed is a liquid crystal display device having a wide viewing angle in which compensation films are provided between a liquid crystal display panel and each polarizer so as to change polarized states of input and output light of the liquid crystal display panel via the polarizers, thereby preventing light leakage in a diagonal direction of the liquid crystal display device in a normally black mode.

19 Claims, 26 Drawing Sheets nx>ny=nz nx<ny=nz nx=ny<nz nx=ny>nz

BRIGHTNESS CONTOUR LINE

BRIGHTNESS CONTOUR LINE

LIQUID CRYSTAL DISPLAY DEVICE HAVING WIDE VIEWING ANGLE

CROSS-REFERENCE TO RELATED APPLICATIONS

This application is a Divisional of application Ser. No. 12/654,587 filed Dec. 23, 2009, which claims priority to Korean Patent Application No. 10-2008-0133974 and 10-2008-0133975, filed Dec. 24, 2008, respectively, all of which are hereby incorporated by reference for all purposes as if fully set forth herein.

BACKGROUND OF THE INVENTION

1. Field of the Invention

The present invention relates to a liquid crystal display (LCD) device, and particularly, to an LCD device capable of improving a viewing angle characteristic by employing a plurality of biaxial optical films.

2. Background of the Invention

Recently, the development of various types of portable electric equipment, such as mobile phones, personal digital assistants (PDAs), and note book computers, is increasing the demands on flat panel display devices which are applicable to those equipment and small in size, light in weight and power-efficient. Examples of the flat panel display device are a liquid crystal display (LCD) device, a plasma display panel (PDP) device, a field emission display (FED) device, a vacuum fluorescent display (VFD) device and the like. Studies on those devices are actively conducted. Among others, the LCD device is currently in the limelight in view of its mass production technology, facilitation of driving scheme and implementation of high color rendering property.

Such LCD device implements various display modes according to alignment of liquid crystal molecules. However, TN mode LCD device is usually used in recent time by virtue of facilitation of white and black color rendering, fast response speed and low driving voltage. In the TN mode LCD device, when a voltage is applied, liquid crystal molecules having aligned parallel with a substrate are re-aligned almost perpendicularly to the substrate, which occurs a problem that a viewing angle becomes narrower when a voltage is applied due to a refractive anisotropy of the liquid crystal molecules.

To overcome the problem of the viewing angle, various modes of LCD devices having a wide viewing angle characteristic have been introduced in recent time. Among others, an In-Plane Switching (IPS) Mode LCD device has actually undergone for mass-production. The IPS-mode LCD device is configured such that at least a pair of electrodes aligned parallel with each other are formed in each pixel so as to create a transversal field actually parallel with a substrate, thus aligning liquid crystal molecules on a plane surface.

FIG. 1 is a view showing an IPS-mode LCD device according to the related art, wherein FIG. 1A is a plane view thereof and FIG. 1B is a sectional view taken along the line I-I' of FIG. 1A.

As shown in FIG. 1A, pixels of a liquid crystal display panel 1 are defined by gate lines 3 and data lines 4 arranged in horizontal and vertical directions. The drawings merely show $(n,m)^{th}$ pixel; however, n gate lines 3 and m data lines 4 are actually arranged on the liquid crystal display panel 1 so as to define n×m pixels on the whole liquid crystal display panel 1. A thin film transistor (TFT) 10 is formed at an intersection between the gate line 3 and the data line 4 in each pixel. The TFT 10 includes a gate electrode 11 to which a scan signal is applied via the gate line 3, a semiconductor layer 12 formed on the gate electrode 11 and activated responsive to the applied scan signal so as to form a channel layer, and a source electrode 13 and a drain electrode 14 formed on the semiconductor layer 12 and to which an image signal is applied via the data line 4. The thusly-constructed TFT 10 applies the image signal input from the exterior into a liquid crystal layer.

A plurality of common electrodes 5 and pixel electrodes 7 arranged to be substantially parallel with the data lines 4. Also, a common line 16 connected to the common electrodes 5 is disposed at the center of each pixel. A pixel electrode line 18 connected to the pixel electrodes 7 is disposed on the common line 16 so as to overlap the common line 16. As the common line 16 and the pixel electrode line 18 overlap each other, a storage capacitance is generated in the IPS-mode LCD device.

As such, in the IPS-mode LCD device having such construction, liquid crystal molecules are aligned to be substantially parallel with the common electrodes 5 and the pixel electrodes 7. When a signal is applied to the pixel electrodes 7 in cooperation with the TFTs 10 being driven, a transversal field substantially parallel with the liquid crystal display panel 1 is generated between the common electrodes 5 and the pixel electrodes 7. The liquid crystal molecules rotate on the same level along the transversal field, thereby preventing a gray scale inversion due to the refractive anisotropy thereof.

Hereinafter, the related art IPS-mode LCD device having such construction will be described in more detail with reference to FIG. 1b.

As shown in FIG. 1B, the gate electrode 11 is formed on a first substrate 20. A gate insulating layer 22 is laminated all over the first substrate 20. A semiconductor layer 12 is formed on the gate insulating layer 22, and the source electrode 13 and the drain electrode 14 are formed on the semiconductor layer 12. A passivation layer 24 is formed all over the first substrate 20. A first alignment layer 28a having a decided alignment direction for aligning liquid crystal molecules by a rubbing or the like, is formed on the passivation layer 24.

Further, a plurality of common electrodes 5 are formed on the first substrates 20, and the pixel electrode 7 and the data line 4 are formed on the gate insulating layer 22, thereby generating a transversal field E between the common electrode 5 and the pixel electrode 7.

A black matrix 32 and a color filter layer 34 are formed on a second substrate 30. The black matrix 32 serves to prevent light leakage into an area in which liquid crystal molecules are not operated. As shown in the drawings, the black matrix 32 is usually formed at a region of the TFT 10 and between pixels (that is, a region of gate line and data line). The color filter layer 34 is provided to render actual colors with red (R), green (G) and blue (B) colors. An overcoat layer 36 for protecting the color filter layer 34 and improving flatness of a substrate is formed on the color filter layer 34, and a second alignment layer 28b having decided alignment direction is formed on the overcoat layer 36.

A liquid crystal layer 40 is formed between the first substrate 20 and the second substrate 30, so as to completely form the liquid crystal display panel 1.

As aforementioned, in the IPS-mode LCD device, the transversal field is generated within the liquid crystal layer 40 by the common electrodes 5 and the pixel electrodes 7 respectively formed on the first substrate 20 and the gate insulating layer 22, accordingly the liquid crystal molecules within the liquid crystal layer 40 are rotated on the same level, thereby preventing the gray scale inversion due to the refractive anisotropy of the liquid crystal molecules.

However, the IPS-mode LCD device has the following problems. That is, in the IPS-mode LCD device, the liquid crystal molecules are rotated on the same level along the transversal field, so as to prevent the gray scale inversion due to the refractive anisotropy of the liquid crystal molecules and thusly improve a viewing angle characteristic in a vertical (up-and-down) direction or a horizontal (right-and-left) direction whereas not improving the viewing angle characteristic in a diagonal direction of a screen.

SUMMARY OF THE INVENTION

Therefore, an object of the present invention is to provide a liquid crystal display (LCD) device capable of improving viewing angle characteristic in a diagonal direction by changing polarization property of light transmitted through the LCD device having a plurality of negative biaxial films.

To achieve these and other advantages and in accordance with the purpose of the present invention, as embodied and broadly described herein, there is provided a liquid crystal display (LCD) device including a liquid crystal display panel having a liquid crystal layer; a first polarizer and a second polarizer located below and above the liquid crystal display panel, respectively, to polarize light; a negative biaxial film provided between the liquid crystal display panel and the second polarizer to change a light polarized state, and the negative biaxial film having a retardation value Re of 240~300 nm in a horizontal direction and a retardation value Rth of 350~550 nm in a thickness direction; and a positive biaxial film provided between the negative biaxial film and the second polarizer to change a light polarized state, and the positive biaxial film having a retardation value Re of 240~300 nm in a horizontal direction and a retardation value Rth of −50~0 nm in a thickness direction, wherein Re=$(n_x-n_y)d$, Rth=$(n_x-n_z)d$, and $n_x$, $n_y$ and $n_z$ denote refractive indexes of x, y and z-axial directions, respectively.

The LCD device may further include a negative C-film provided between the first polarizer and the LC panel to change a light-polarized state, the negative C-film having a retardation value Re of 0 nm in a horizontal direction and a retardation value Rth of 20~150 nm in a thickness direction. The LC panel is either an In Plane switching (IPS) mode LC panel or a Fringe Field Switching (FFS) mode LC panel.

In another aspect of the present invention, there is provided a liquid crystal display (LCD) device including, a liquid crystal display panel having a liquid crystal layer; a first polarizer and a second polarizer located below and above the liquid crystal display panel, respectively, to polarize light; a negative A-film provided between the liquid crystal display panel and the first polarizer to change a light polarized state, the negative A-film having a retardation value Re of −150~30 nm in a horizontal direction and a retardation value Rth of 0 nm in a thickness direction; and a positive biaxial film provided between the liquid crystal display panel and the second polarizer to change a light polarized state, and the positive biaxial film having a retardation value Re of 180~240 nm in a horizontal direction and a retardation value Rth of −60~0 nm in a thickness direction, wherein Re=$(n_x-n_y)d$, Rth=$(n_x-n_z)d$, and $n_x$, $n_y$ and $n_z$ denote refractive indexes of x, y and z-axial directions, respectively.

According to the present invention, the negative biaxial film and the positive biaxial film are disposed between each polarizer and the liquid crystal display panel so as to change polarization property of a polarized light incident on the liquid crystal display panel. The change in the polarization property allows an optical axis of light incident on the second polarizer to match with an absorption axis of the second polarizer, resulting in improvement of a viewing angle characteristic in a diagonal direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

A lowering of a viewing angle characteristic when viewing an LCD device in a diagonal direction is caused by light leakage in the diagonal direction of the LCD device, which will be described in detail, hereinafter.

Figure 1A:
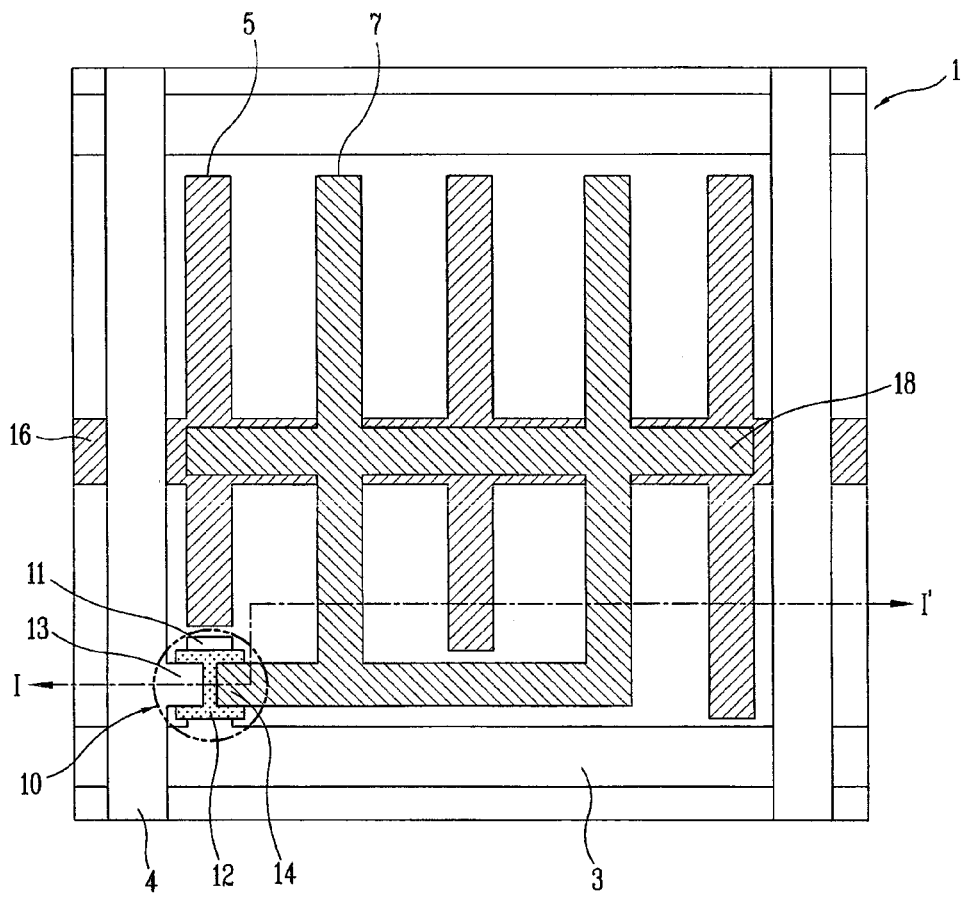
FIGS. 1A and 1B are views showing a structure of a related art IPS-mode LCD device.
Figure 1B:
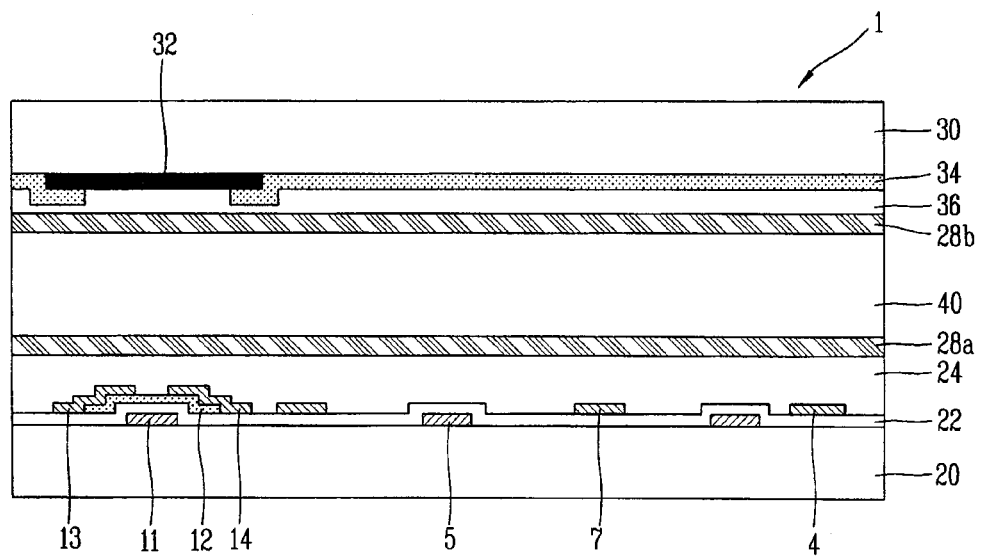
Figure 2:
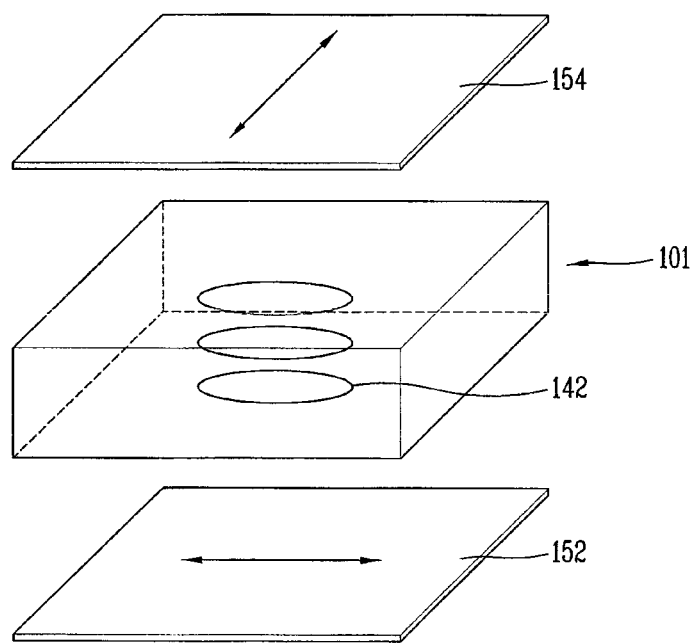
FIG. 2 is a perspective view briefly showing the structure of a LCD device.

As shown in FIG. 2, a first polarizer 152 and a second polarizer 154 are attached onto upper and lower portions of a liquid crystal (LC) panel 101 of a typical IPS-mode LCD device, so as to linearly polarize input and output light of the LC panel 101.

In a normally black mode, polarization axes of the first and second polarizers 152 and 154 attached onto the upper and lower substrates are perpendicular to each other. Hence, light transmitted through the first polarizer 152 is linearly polarized in an x-axial direction to be input into the LCD device. When no signal is applied to the LC panel 101, liquid crystal molecules 142 of the LC panel 101 are aligned toward the x-axial direction, accordingly light incident on the LC panel 101 is transmitted through the LC panel 101 in the linearly polarized state in the x-axial direction. Meanwhile, a polarization axis of the second polarizer 154 attached onto the upper substrate is perpendicular to a polarizing direction of light transmitted through a liquid crystal layer. Accordingly, light is all absorbed by the polarizer 154 of the upper substrate such that no light is output out of the second polarizer 152, resulting in rendering a screen entirely black.

However, when viewing the LCD device in a diagonal direction, the polarization directions of the first and second polarizers 152 and 154 are not disposed substantially perpendicular to each other. That is, the first and second polarizers 152 and 154 are perpendicular to each other when viewing the LCD device from a front side, while not being perpendicular when viewing the same in the diagonal direction.

Figure 3A:
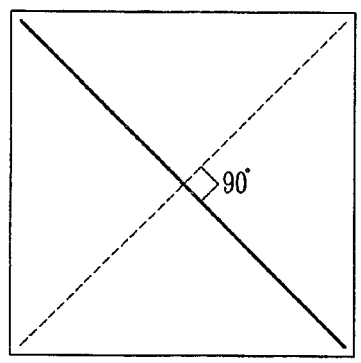
FIG. 3A is a view showing absorption axes of upper and lower polarizers when viewing an LCD device from a front side.
Figure 3B:
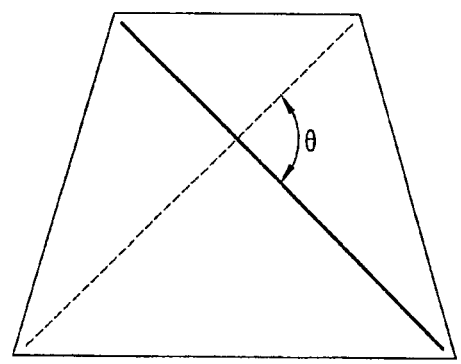
FIG. 3B is a view showing the absorption axes of the upper and lower polarizers when viewing the LCD device in a diagonal direction.

FIG. 3A shows that polarization axes of the first and second polarizers 152 and 154 arranged when viewing the LCD device from a front side, namely, on a path of light transmitted perpendicular to a screen of the LCD device, and FIG. 3B shows polarization axes of the first and second polarizers 152 and 154 arranged when viewing the LCD device in a diagonal direction, namely, on a path of light transmitted through the screen of the LCD device at a polar angle and at an azimuthal angle. Here, in the drawing, the dotted line denotes a direction of a polarization axis (i.e., light absorption axis) on the first polarizer 152 and a solid line denotes a direction of a light absorption axis on the second polarizer 154.

As shown in FIG. 3A, when viewing the LCD device from the front side (i.e., when light is perpendicularly transmitted through the screen of the LCD device), the polarization axes of the first and second polarizers 152 and 154 are perpendicular to each other. However, as shown in FIG. 3B, when viewing the LCD device in the diagonal direction (i.e., when light is transmitted through the screen of the LCD device at a preset polar angle and at a preset azimuthal angle, the polarization axes of the first and second polarizers 152 and 154 are not perpendicular to each other but disposed with a preset angle θ therebetween.

As such, when viewing the LCD device in the diagonal direction, since the polarization directions of the first and second polarizers 152 and 154 are not perpendicular to each other, light which has been linearly polarized at the first polarizer 152 and transmitted through the LC panel 101 is rather partially transmitted through the second polarizer 154 without being completely absorbed by the second polarizer 154. Therefore, even in the normally black state, when viewing the LCD device in the diagonal direction, light is partially leaked out, which makes it impossible to maintain a completely black state.

Thus, when viewing the LCD device in the diagonal direction, since the polarization directions of the first and second polarizers 152 and 154 are not perpendicular to each other and thereby the light polarized at the first polarizer 152 is partially leaked out without being completely absorbed by the second polarizer 154, a viewing angle characteristic is lowered. Hence, in order to improve the viewing angle characteristic when viewing the LCD device in the diagonal direction, light polarized at the first polarizer 152 should be completely absorbed by the second polarizer 154. To this end, in the present invention, a compensation film is used to change the polarization direction of light transmitted through the LC panel 101 so as to match optical axis of light incident on the second polarizer 154 with the polarization direction (i.e., light absorption layer) of the second polarizer 154.

The compensation film may be categorized into a uniaxial film and a biaxial film. The uniaxial film is an anisotropic birefringence film having a single optical axis, and the biaxial film is an anisotropic birefringence film having two optical axes. Of the compensation films, the uniaxial film may be divided into A-compensation film and C-compensation film according to direction and size of the optical axis. Refractive index characteristics of the A-compensation film and C-compensation film are shown in FIGS. 4 and 5.

Figure 4A:
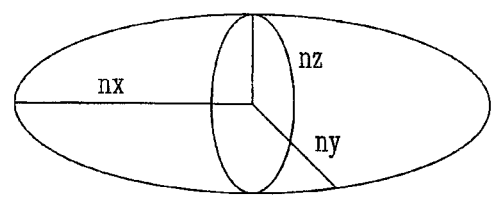
FIGS. 4A and 4B are views showing the relation of refractive indexed of A-compensation film in x, y and z-axial directions.
Figure 4B:
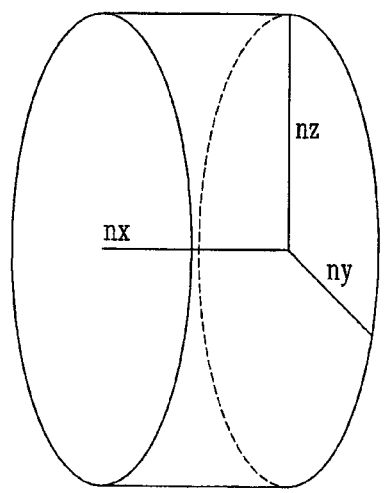

FIGS. 4A and 4B respectively show a positive A-compensation film and a negative A-compensation film. As shown in FIGS. 4A and 4B, the A-compensation film is characterized in that a refractive index $n_y$ in y-axial direction is the same to a refractive index $n_z$ in z-axial direction (i.e., $n_y=n_z$) and a refractive index $n_x$ in x-axial direction is different from the refractive indexes $n_y$ and $n_z$ in the y-axial direction and the z-axial direction (i.e., $n_x \neq n_y = n_z$). As shown in FIG. 4A, if the refractive index $n_x$ in the x-axial direction is greater than the refractive index $n_y$ in the y-axial direction, it is a positive A-compensation film. To the contrary, if the refractive index $n_x$ in the x-axial direction is smaller than the refractive index $n_y$ in the y-axial direction, it is a negative A-compensation film. The positive A-compensation film and the negative A-compensation film can be defined according to Equation 1 as follows.

$$n_x > n_y = n_z$$

$$n_x < n_y = n_z \quad \text{[Equation 1]}$$

Figure 5A:
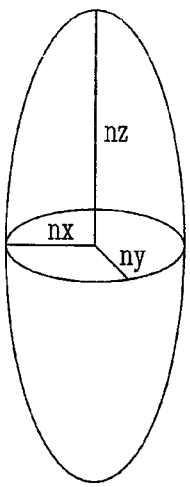
FIGS. 5A and 5B are views showing the relation of refractive indexed of C-compensation film in x, y and z-axial directions.
Figure 5B:
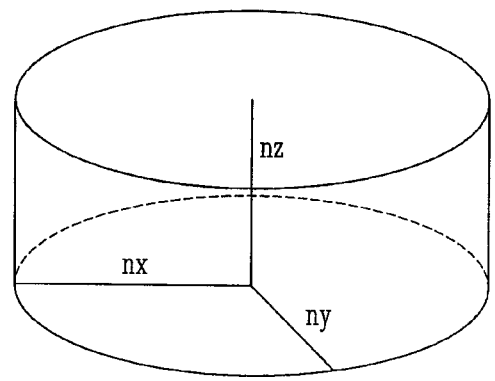

In the meantime, FIGS. 5A and 5B respectively show a positive C-compensation film and a negative C-compensation film. As shown in FIGS. 5A and 5B, the C-compensation film is characterized in that a refractive index $n_x$ in x-axial direction is the same to a refractive index $n_y$ in y-axial direction ($n_x = n_y$) and a refractive index $n_z$ in z-axial direction is different from the refractive indexes $n_x$ and $n_y$ in the x-axial direction and the y-axial direction (i.e., $n_z \neq n_x = n_y$). As shown in FIG. 5A, if the refractive index $n_x$ in the x-axial direction and the refractive index $n_y$ in the y-axial direction are smaller than the refractive index $n_z$ in the z-axial direction, it is a positive C-compensation film. To the contrary, if the refractive index $n_x$ in the x-axial direction and the refractive index $n_y$ in the y-axial direction are greater than the refractive index $n_z$ in the z-axial direction, it is a negative C-compensation film. The positive C-compensation film and the negative C-compensation film can be defined according to Equation 2 as follows.

$$n_x = n_y < n_z$$

$$n_x = n_y > n_z \quad \text{[Equation 2]}$$

Also, retardation by the compensation films is determined according to the refractive index $n_x$ in the x-axial direction, the refractive index $n_y$ in the y-axial direction and the refractive index $n_z$ in the z-axial direction, the relation between the retardation and the refractive indexes $n_x$, $n_y$ and $n_z$ may be defined according to Equation 3.

$$Re = (n_x - n_y)d$$

$$Rth = (n_x - n_z)d \quad \text{[Equation 3]}$$

where Re denotes a retardation value in a horizontal direction, and Rth denotes a retardation value in a thickness direction. Also, d denotes a thickness of a compensation film.

Examples of the A-compensation film and the C-compensation film may usually include cycloolefin polymer film, polycarbonate film, UV-curable horizontal or horizontally-aligned liquid crystal film, polystyrene resin and polyethylene terephthalate.

Figure 6:
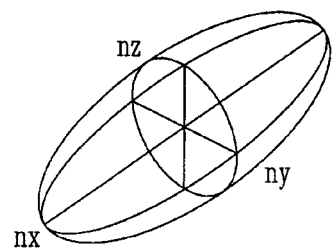
FIG. 6 is a view showing the relation of refractive indexed of a biaxial compensation film in x, y and z-axial directions.

The biaxial film may be categorized into a positive biaxial film, a negative biaxial film, and z-axis-stretched biaxial film. FIG. 6 shows refractive index $n_x$ in x-axial direction, refractive index $n_y$ in y-axial direction and refractive index $n_z$ in z-axial direction of the biaxial film. The biaxial film may be classified into a positive biaxial film, a negative biaxial film and a z-axis-stretched biaxial film according to the ratio of the refractive indexes $n_x$, $n_y$ and $n_z$ in the x, y and z-axial directions. The positive biaxial film, the negative biaxial film and the z-axis-stretched biaxial film can respectively be defined by Equation 4.

$$n_z > n_x > n_y$$

$$n_x > n_y > n_z$$

$$n_x > n_z > n_y \quad \text{[Equation 4]}$$

Also, Biaxiality of the biaxial film can be expressed according to Equation 5 as follows.

$$Nz = Rth/Re \quad \text{[Equation 5]}$$

As defined in Equation 3, Re denotes a retardation value in a horizontal direction, Rth denotes a retardation value in a thickness direction, and d denotes a thickness of a compensation film.

According to the definitions of Equations 4 and 5, the negative biaxial film is $Nz \geq 1$, the positive biaxial film is $Nz < 0$, and the z-axis-stretched biaxial film is $0 < Nz < 1$.

In the present invention, the use of the compensation films allows light linearly polarized at the first polarizer 152 to be phase-transformed such that the polarization direction of the light can completely be perpendicular to the polarization direction of the second polarizer 154, thereby enabling complete absorption of light incident on the second polarizer 154.

The light polarized state can be analyzed by the Jones Matrix. According to the Jones calculation, since light reflection at a boundary surface is ignored, the Jones matrix exhibiting polarization transmission characteristics of transparent media is a unitary matrix, which can be expressed by the Poincare sphere.

The Jones vector can merely exhibit complete polarization. Thus, in order to exhibit partial polarization, strokes parameters defined according to the following Equation 6 should be used.

$$S_0 = \langle |E_x|^2 \rangle + \langle |E_y|^2 \rangle \quad \text{[Equation 6]}$$

$$S_1 = \langle |E_x|^2 \rangle - \langle |E_y|^2 \rangle$$

$$S_2 = 2|E_x||E_y|\langle \cos(\phi_x - \phi_y) \rangle$$

$$S_3 = 2|E_x||E_y|\langle \sin(\phi_x - \phi_y) \rangle$$

where $\langle \ \rangle$ denotes time average, and $E_x$ and $E_x$ denote magnetic field components in x-axial and y-axial directions. Here, an inequality of $S_0^2 \text{ES}_1^2 + S_2^2 + S_3^2$ is established among those four variables. This inequality is satisfied only for a complete polarization. That is, for the complete polarization, Equation 7 will be defined among standardized variables s1, s2 and s3, which are obtained by dividing S1, S2 and S3 by light brightness S0.

$$s_1^2 + s_2^2 + s_3^2 + 1 \quad \text{[Equation 7]}$$

This is an equation of the Poincare sphere having a radius of 1 in a three-dimensional space, wherein (s1, s2, s3) denote points of orthogonal coordinates of Poincare sphere.

Here, in the Poincare sphere, all points on the equator represent a linear polarized state, and the arctic corresponds to right-handed circular polarization and the Antarctic corresponds to left-handed circular polarization. Also, all points of the Northern hemisphere correspond to right-handed elliptical polarization, and all points of the Southern hemisphere correspond to left-handed elliptical polarization.

Figure 7A:
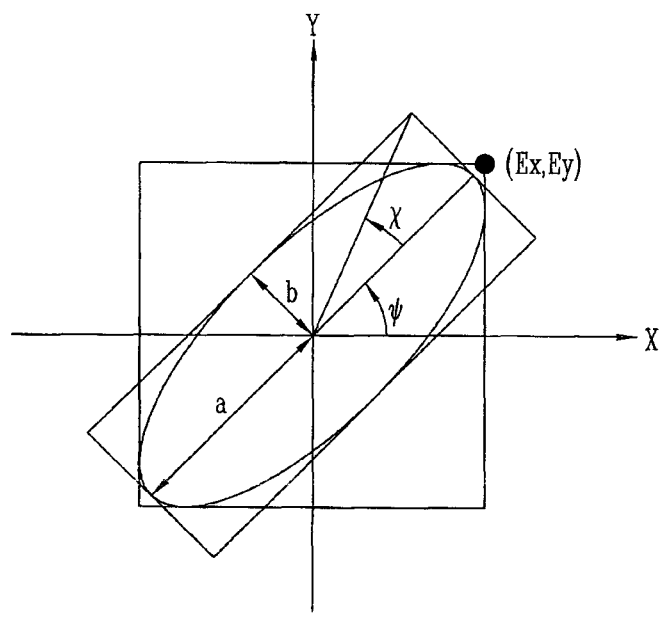
FIGS. 7A and 7B are an elliptical polarization of each light and corresponding Poincare vectors.
Figure 7B:
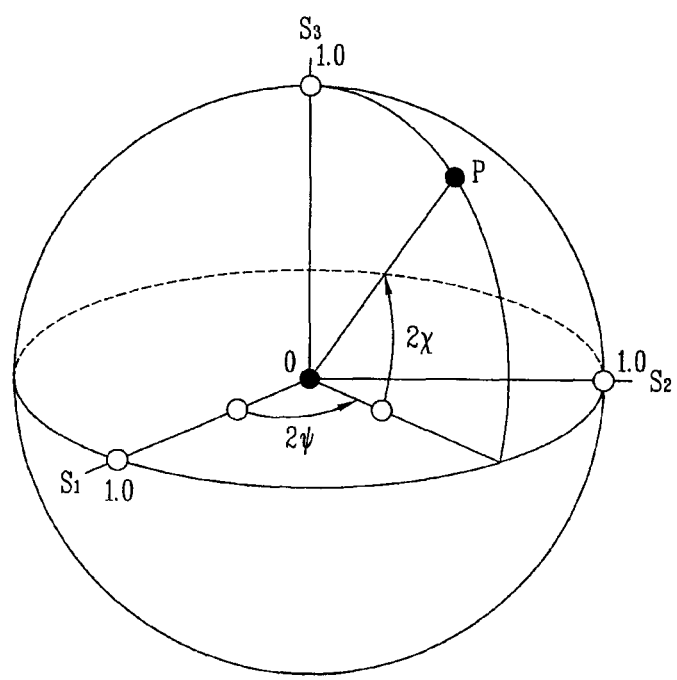

FIGS. 7A and 7B are views showing an arbitrary elliptical polarization in an orthogonal coordinate system and corresponding Poincare vector.

As shown in FIGS. 7A and 7b, for the Poincare vector P, corresponding to an elliptical polarization in which an azimuthal angle of a long axis thereof is Ψ and an elliptical angle is x, a latitude angle is 2x, an azimuthal angle is 2Ψ and orthogonal coordinates are (cons(2Ψ)cons(2x), sin(2Ψ)cos (2x), sin(2x)). If this point is located on the Northern hemisphere, an electric field vector is rotated in a clockwise direction, and if the point is located on the Southern hemisphere, the electric field vector is rotated in a counterclockwise direction. Here, antipodes on the Poincare sphere represent an orthogonally polarized state.

Further, the unitary Jones matrix representing the change in the polarized state when light passes through a transparent medium can be analyzed by a rotation conversion on the Poincare sphere.

Figure 8:
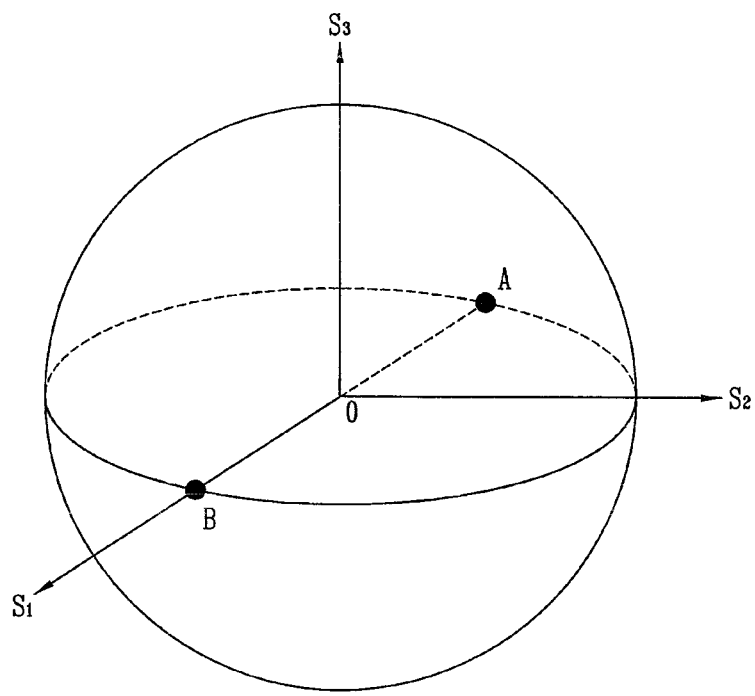
FIG. 8 is a view showing polarized states of light in Poincare sphere when viewing the LCD device from a front side.

FIG. 8 shows the Poincare sphere representing the polarized states of the first and second polarizers 152 and 154 when viewing the IPS-mode LCD device from a front side as shown in FIG. 3A.

Since the antipodes on the Poincare sphere represent the orthogonally polarized state, point A indicates a light absorption axis of the first polarizer 152 and a light transmission axis of the second polarizer 154, and point B indicates a light transmission axis of the first polarizer 152 and a light absorption axis of the second polarizer 154. As shown in FIG. 8, when viewing the IPS-mode LCD device from the front side, the light transmission axis of the first polarizer 152 maintains the same linearly polarized state to the light absorption axis of the second polarizer 154. Thus, since the light absorption axis of the first polarizer 152 is perpendicular to the light absorption axis of the second polarizer 154 when viewing the IPS-mode LCD device from the front side, the light transmission axis of the first polarizer 152 and the light absorption axis of the second polarizer 154 are parallel to each other.

As such, since the light transmission axis of the first polarizer 152 and the light absorption axis of the second polarizer 154 are parallel to each other and accordingly the light transmission axis of the first polarizer 152 and the light absorption axis of the second polarizer 154 are located at the same point, the linearly polarized light transmitted through the first polarizer 152 is all absorbed by the second polarizer 154 such that no light is externally transmitted through the second polarizer 154. Accordingly, in the normally black mode, when viewing the IPS-mode LCD device from the front side, the completely black state can be maintained.

Figure 9:
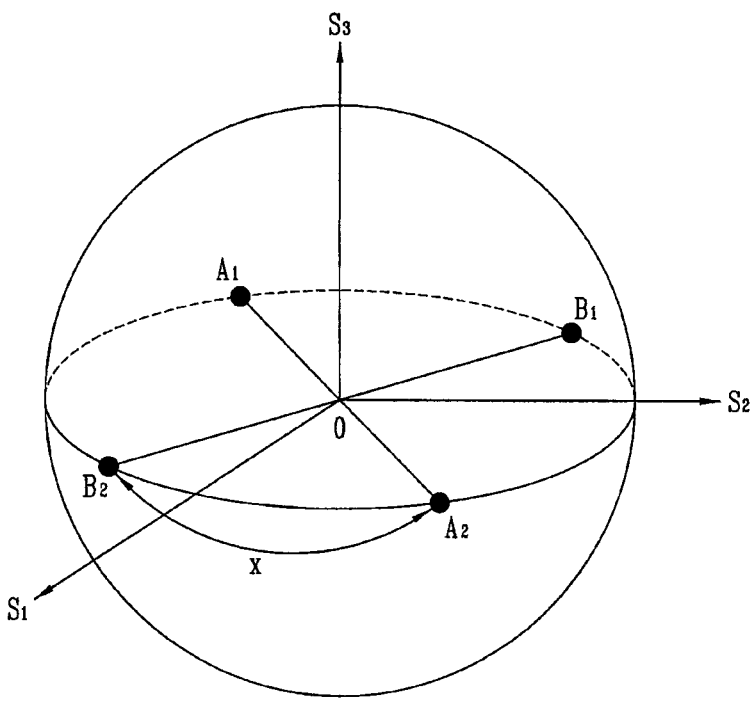
FIG. 9 is a view showing polarized states of light in Poincare sphere when viewing the LCD device in a diagonal direction.

In the meantime, FIG. 9 shows the Poincare sphere representing the polarized state of light when viewing the IPS-mode LCD device in a diagonal direction.

In FIG. 9, point A1 indicates a light absorption axis of the first polarizer 152 and the corresponding antipodal point A2 indicates a light transmission axis of the first polarizer 152 orthogonal to the light absorption axis. Also, point B1 indicates a light transmission axis of the second polarizer 154 and point B2 indicates a light absorption axis of the second polarizer 154. As shown in FIG. 3B, when viewing the IPS-mode LCD device in the diagonal direction, the polarization directions of the first polarizer 152 and the second polarizer 154 form a preset angle θ without being perpendicular to each other. Accordingly, the point A2 as the light transmission axis of the first polarizer 152 and the point B2 as the light absorption axis of the second polarizer 154 do not match but has an interval by x. The interval x indicates an angle between the light transmission axis of the first polarizer 152 and the light absorption axis of the second polarizer 154. Light as much as corresponding to the angle between the light transmission axis of the first polarizer 152 and the light absorption axis of the second polarizer 154 is transmitted through the second polarizer 154. Therefore, in order to prevent light leakage in the diagonal direction of the IPS-mode LCD device, the point A2 and the point B2 should match each other such that the light transmission axis of the first polarizer 152 is parallel to the light absorption axis of the second polarizer 154, whereby light polarized at the first polarizer 152 can completely be absorbed at the second polarizer 154.

In the present invention, the polarized state of light, which was linearly polarized at the first polarizer 152 is changed by use of the compensation films so as to match the point A2 with the point B2 in the Poincare sphere (i.e., the light transmission axis of the first polarizer 152 is allowed to be parallel to the light absorption axis of the second polarizer 154), thereby preventing the light leakage which may be caused due to light being transmitted through the second polarizer 154.

Hereinafter, detailed embodiments of the present invention will be described. Here, the polarized state of the LCD device in accordance with the embodiments of the present invention will be described by use of the Poincare sphere. As described above, the present invention is configured to change the polarized state of light by using the biaxial films so as to prevent the light leakage in the diagonal direction of the LCD device.

Figure 10:
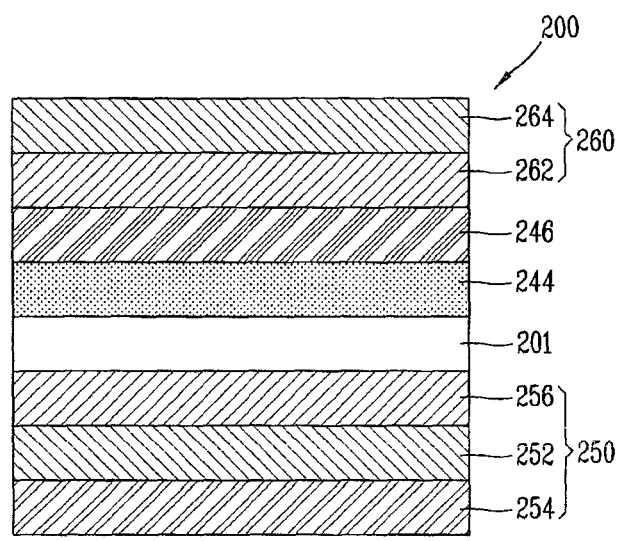
FIG. 10 is a view showing a structure of an LCD device in accordance with a first embodiment of the present invention.

FIG. 10 shows a structure of an LCD device in accordance with a first embodiment of the present invention.

As shown in FIG. 10, an LCD device 200 in accordance with a first embodiment of the present invention may include an LC panel 201 for implementing images, a first compensation film 244 and a second compensation film 246 attached onto an upper portion of the LC panel 201, a first polarizer 250 attached onto a lower portion of the LC panel 201, and a second polarizer 260 attached onto an upper portion of the second compensation film 246.

Although not shown in the drawing in detail, the LC panel 201 may include a first substrate, a second substrate and a liquid crystal layer interposed between the first and second substrates. TFTs, patterns of gate lines and data lines and various electrodes may be formed on the first substrate, and a color filter layer rendering actual colors and a black matrix for preventing deterioration of image quality due to light leakage into an image non-display region may be formed on the second substrate.

Especially, the LC panel 201 according to the preset invention is an IPS-mode LC panel. Therefore, common electrodes and the pixel electrodes are disposed parallel to each other on the first substrate, thus to apply to the liquid crystal layer a magnetic field parallel to the surface of the substrate. Alternatively, a fringe field switching (FFS) mode LC panel may also be used as the LC panel 201 of the present invention.

The first polarizer 250 may be provided with a first polarizing body 252, a first supporting body 254 and a second supporting body 256. The first polarizing body 252 is a film which may convert natural light into an arbitrary polarized light. Here, the first polarizing body 252 may be one having a function that when dividing incident light into two orthogonal polarization components, one polarization component of the two is allowed to be transmitted and another one is absorbed, reflected or dispersed. Although there is not any specific limit to an optical film used for the first polarizing body 252, examples of the optical film may include a polymer film having as a main component a polyvinyl alcohol (PVA) based resin containing iodine or dichromatic dye, O-type polarizing body in which a liquid crystalline composition containing a dichromatic material and a liquid crystalline compound is aligned in a preset direction, E-type polarizing body in which lyotropic liquid crystal is aligned in a preset direction, and the like. The first supporting body 254 is to protect the first polarizer 252, and usually uses a typical protection film without retardation. Any can be used as the protection film, but usually triacetylcellulose (TAC) is used.

The second supporting body 256 may be made of a typical protection film without retardation for protecting the first polarizing body 252. For example, the second supporting body 256 may be formed of O-RT (indicating a transformed TAC of which Rth is close to 0 nm and also called 0-TAC), cycloolefin-polymer (COP) and the like. For reference, the phase 'without retardation' denotes that Re is 0. The TAC denotes a protection film that Re is 0 and Rth is not 0, and the 0-RT denotes a protection film that Re is 0 and Rth is close to 0.

Also, the second polarizer 260 may be provided with a second polarizing body 262 and a third supporting body 264. The second polarizing body 262 may be made of the polyvinyl alcohol (PVA) based resin, similar to the first polarizing body 252. For the third supporting body 264, triacetylcellulose (TAC) is used as a transparent protection film.

In the meantime, in FIG. 10, the second supporting body 256 formed of the TAC without retardation Rth is disposed between the first polarizing body 252 and the LC panel 201. Alternatively, the second supporting body 256 may not be independently configured so that the first polarizer 252 can directly contact the LC panel 201. Also, FIG. 10 shows that the second polarizing body 262 directly contacts the second compensation film 246. Alternatively, a fourth supporting body formed of the TAC without retardation Rth is provided at the second polarizer 260 so that the fourth supporting body can be disposed between the second polarizing body 262 and the second compensation film 246.

The first compensation film 244 is a negative biaxial compensation film, having a retardation value Re of 240~300 nm in a horizontal direction (i.e., Re=240~300 nm) and a retardation value Rth of 350~550 nm in a thickness direction (i.e., Rth=350~550 nm). Therefore, biaxiality Nz of the biaxial film of the first compensation film 244 is in the range of 1.4<Nz<1.8 according to Equation 5. In general, if the biaxiality of a biaxial film is Nz>1, the biaxial film is a negative biaxial film, thus having a relation of $n_x > n_y > n_z$ among refractive indexes $n_x$, $n_y$ and $n_z$ in x, y and z-axial directions.

Also, the second compensation film 246 is a positive biaxial compensation film, having a retardation value Re of 240~300 nm in a horizontal direction (i.e., Re=240~300 nm) and a retardation value Rth of 50~0 nm in a thickness direction (i.e., Rth=50~0 nm). Therefore, biaxiality Nz of the biaxial film of the second compensation film 246 is in the range of −4.8<Nz<0 according to Equation 5. In general, if the biaxiality of a biaxial film is Nz<0, the biaxial film is a positive biaxial film, thus having a relation of $n_z > n_x > n_y$ among refractive indexes $n_x$, $n_y$ and $n_z$ in x, y and z-axial directions. Moreover, if the biaxiality Nz of the biaxial film is 0<Nz<1, the biaxial film is a z-axis-stretched biaxial film, thus having a relation of $n_x > n_z > n_y$ among refractive indexes $n_x$, $n_y$ and $n_z$ in x, y and z-axial directions. Therefore, the first compensation film 244 is a negative biaxial film of which the biaxiality Nz of the biaxial film is Nz>1, and the second compensation film 246 is a positive biaxial film of which the biaxiality Nz of the biaxial film is Nz<0.

Examples of the first and second compensation films 244 and 246, namely, the negative and positive biaxial films, may include UV-curable liquid crystal film, polycarbonate, polyethylene terephthalate, polystyrene, uniaxially-stretched TAC, uniaxially-stretched polynorbonene (PNB), biaxially-stretched polycarbonate (PC), biaxially-stretched COP, biaxial LC film and the like. Also, the second compensation film 246 may have various characteristics of normal wavelength dispersion, flat wavelength dispersion and reverse wavelength dispersion.

An absorption axis of the first polarizer 250 is disposed at an angle of 90° and an absorption axis of the second polarizer 260 is disposed at an angle of 0°. Also, the refractive index $n_x$ in the x-axis of the first compensation film 244 is disposed at an angle of 90°. $n_x$ direction of the second compensation film 246 is disposed at an angle of 0° and a rubbing direction of the LC panel 201 also forms an angle of 90°.

Liquid crystal molecules of the LC panel 201 are disposed along the rubbing direction of an alignment layer upon an off-state of the LC panel 201. Accordingly, an optical axis of the liquid crystal molecules also forms an angle of 90°. Thus, the reason why the LC panel 201 has a rubbing direction of 90° is described as follows.

Typically, common electrodes and pixel electrodes creating a lateral magnetic field in the IPS-mode LCD device are arranged along data lines, accordingly the rubbing direction of an alignment layer forms an angle of about 15°~45°.

Figure 11:
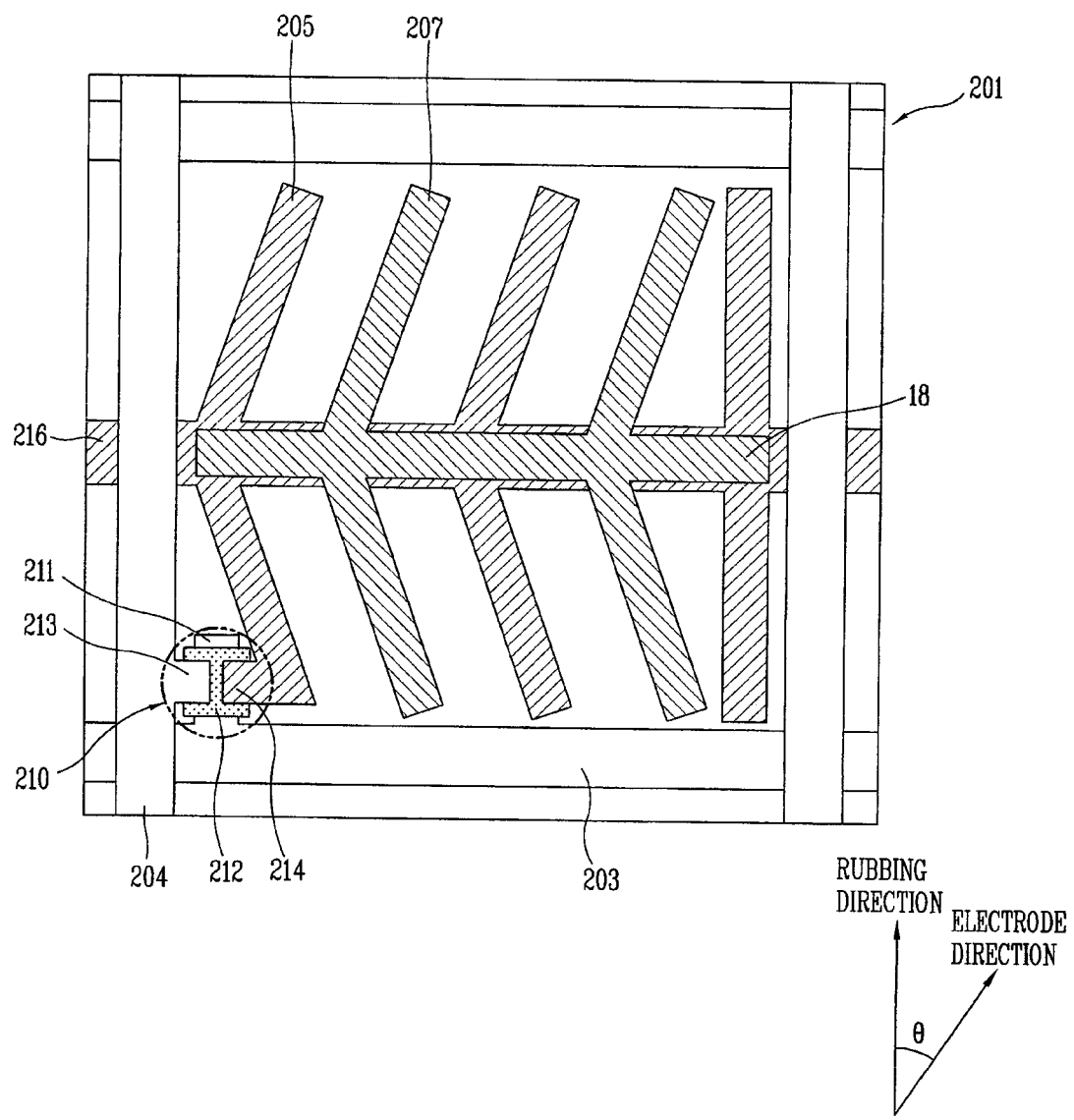
FIG. 11 is a sectional view showing a structure of an LC panel according to the present invention.

However, as shown in FIG. 11, in the present invention, common electrodes 205 and pixel electrodes 207 of the IPS-mode LC panel 201 are curved at least once by a preset angle within a pixel defined by gate lines 203 and data lines 204, and rubbing of an alignment layer is executed in a data line direction, namely, at an angle of 90°. That is, the direction of the electrodes 205 and 207 and the alignment direction form a preset angle θ therebetween.

As such, curving the common electrodes 205 and the pixel electrodes 207 is to form a plurality of domains having different main viewing angles within one pixel, thereby improving a viewing angle characteristic of the LCD device. The common electrode 205 and the pixel electrode 207 are formed at a preset angle with the data line 204 and the rubbing of the alignment layer is executed in the data line direction. Accordingly, the disposed direction of the common electrodes 205 and the pixel electrodes 207 forms a preset angle (for example, approximately, θ=15°~45°) with the rubbing direction.

The present invention will not be limited to the IPS-mode LCD device having the above structure, but may be applicable to a FFS-mode LCD device having a rubbing direction of 90° and forming a preset angle between the disposed direction of electrodes and the rubbing direction.

Polarized states of the LCD device in accordance with the first embodiment having such structure will be described with reference to FIGS. 12A to 12C. Here, FIG. 12A shows a polarized state of each component of the LCD device according to the present invention, FIG. 12B shows the Poincare sphere representing the polarized states in the LCD device according to the present invention, and FIG. 12C is a two-dimensional view of FIG. 12B, namely, a protected view of the Poincare sphere.

Figure 12A:
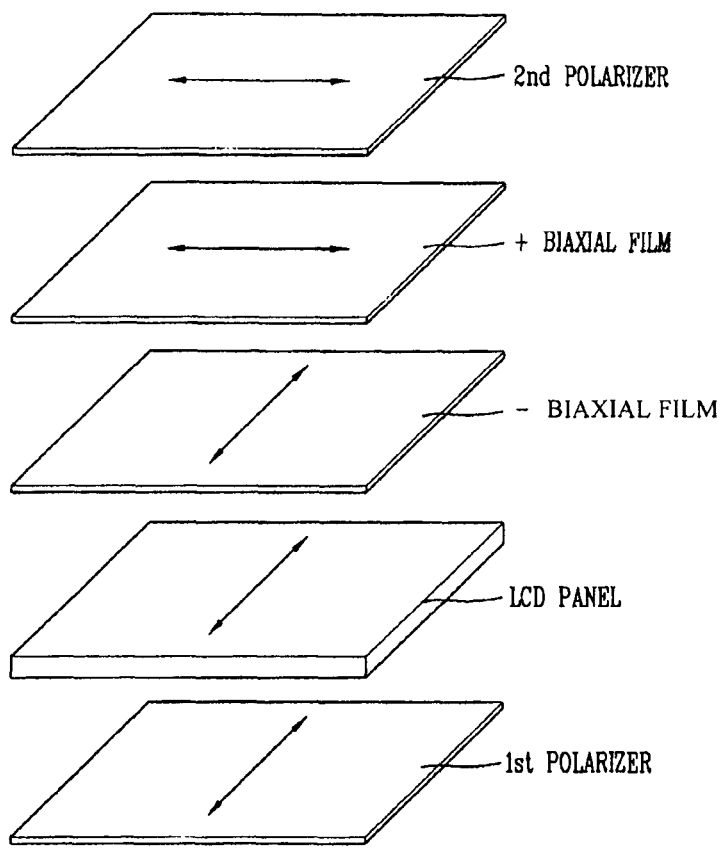
FIG. 12A is a view showing an optical axis of the LCD device in accordance with the first embodiment of the present invention.

As shown in FIG. 12A, the first compensation film 244 implemented as a negative biaxial film is disposed between the LC panel 201 and the second compensation film 246. Here, n, direction of the first compensation film 244 is horizontal to a light absorption axis of the first polarizer 250 and the rubbing direction of the LC panel 201. Also, the second polarizer 260 is disposed at an upper portion of the LC panel 201 (i.e., $n_x$ direction forms an angle of 90°). Here, a light absorption axis of the second polarizer 260 is perpendicular to the rubbing direction of the LC panel 201 (i.e., the light absorption axis of the second polarizer 260 is formed at an angle of 0°). Also, the second compensation film 246 implemented as a positive biaxial film is disposed between the first compensation film 244 and the second polarizer 260. Here, $n_x$ direction of the second compensation film 246 is perpendicular to the rubbing direction of the LC panel 201, and parallel to the light absorption axis of the second polarizer 260 (i.e., the $n_x$ direction forms an angle of 0°).

Figure 12B:
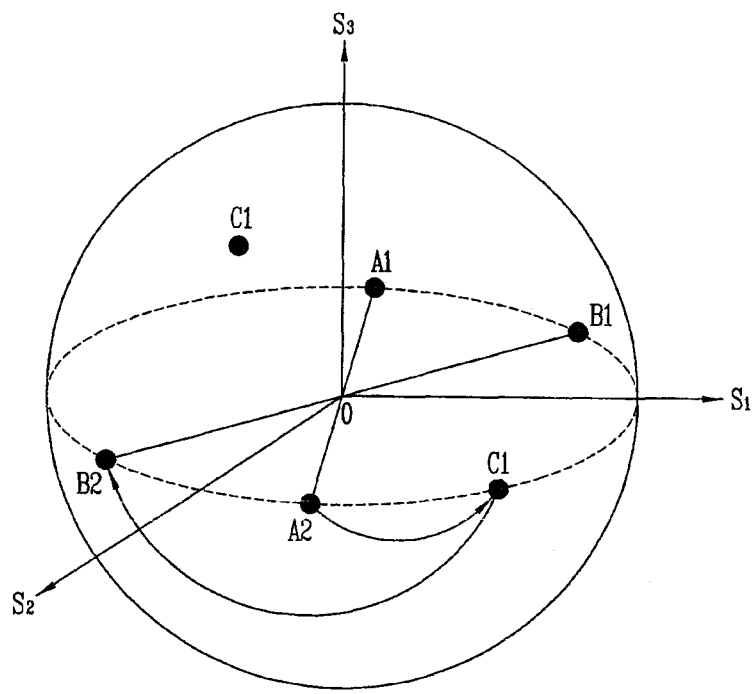
FIG. 12B is a view showing Poincare sphere in which light polarized states in the LCD device in accordance with the first embodiment of the present invention.
Figure 12C:
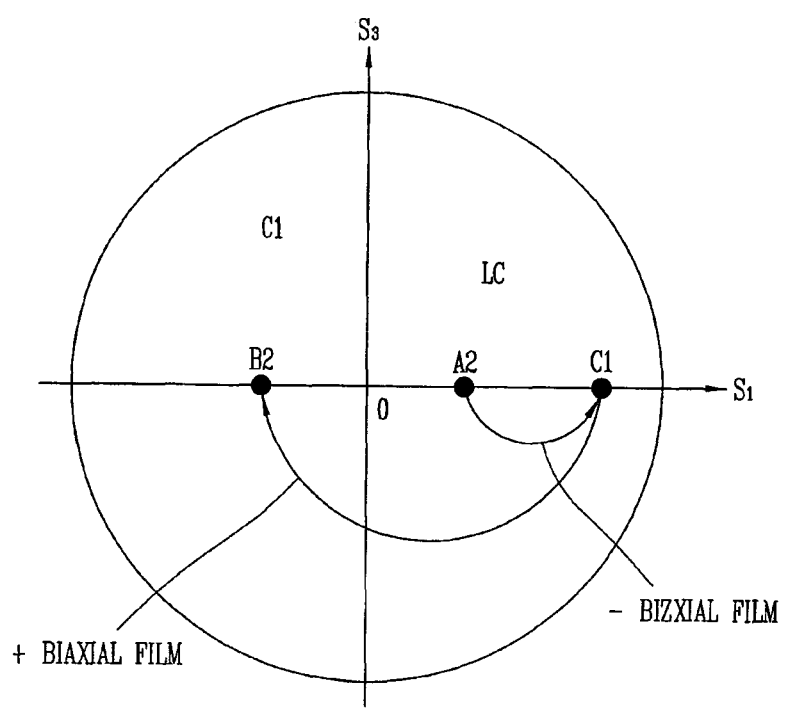
FIG. 12C is a protected view of FIG. 12B.

As shown in FIG. 12B, if non-polarized light is incident on the first polarizer 250 from a backlight of the LC panel 201, such light is linearly polarized. Most of the linearly polarized light is absorbed at the absorption axis (point A1) of the first polarizer 250 and the polarized state of the light transmitted through the first polarizer 250 is located at point A2. That is, the transmission axis of the first polarizer 250 is located at point A2. Here, the absorption axis of the second polarizer 260 is located at point B2 so as to be spaced apart from the transmission axis of the first polarizer 250 by a preset distance.

If the light linearly polarized at the first polarizer 250 is transmitted through the LC panel 201, because the alignment layer is in a rubbed state by an angle of 90°, the linearly polarized light at the first polarizer 250 is allowed to have no retardation within the liquid crystal layer. Therefore, the light transmitted through the LC panel 201 remains polarized, accordingly the polarized state of the LC panel 201 is maintained at the point A2.

If the light transmitted through the LC panel 201 is then transmitted through the first compensation film 244 implemented as the negative biaxial film, the polarized state is rotated from point A2 to point C1. Here, because the first compensation film 244 is the negative biaxial film, the optical axis is present between $n_x$-axis and $n_z$-axis. Hence, the light-polarized state is rotated in a counterclockwise direction based upon the optical axis between $n_x$-axis and $n_z$-axis, such that the polarized state is moved from point A2 to point C1.

When the light transmitted through the first compensation film 244 is then transmitted through the second compensation film 246 implemented as the positive biaxial film, the polarized state is rotated from point C2 to point B2. Here, because the second compensation film 246 is the positive biaxial film, the optical axis is present between $n_y$-axis and $n_z$-axis. Hence, the light-polarized state is rotated in a clockwise direction based upon the optical axis between $n_y$-axis and $n_z$-axis, such that the polarized state is moved from point C2 to point B2. Consequently, the light transmitted through the second compensation film 246 is changed to linearly-polarized light with the same optical axis as the absorption axis of the second polarizer 260. Such polarized light is entirely absorbed by the second polarizer 260, and accordingly, light cannot be transmitted through the second polarizer 260.

As shown in FIG. 12C, the linearly-polarized light at the first polarizer 250 remains linearly-polarized (corresponding to point A2) while transmitted through the LC panel 201. The polarized state is changed by the first compensation film 244, and then becomes consistent with point B2 by virtue of the last second compensation film 246, namely, the positive biaxial film. Accordingly, the optical axis of light incident on the second polarizer 260 can be consistent with the absorption axis of the second polarizer 260. As a result, the light polarized at the first polarizer 250 can all be absorbed by the second polarizer 260, thereby preventing light leakage in a diagonal direction.

Figure 13:
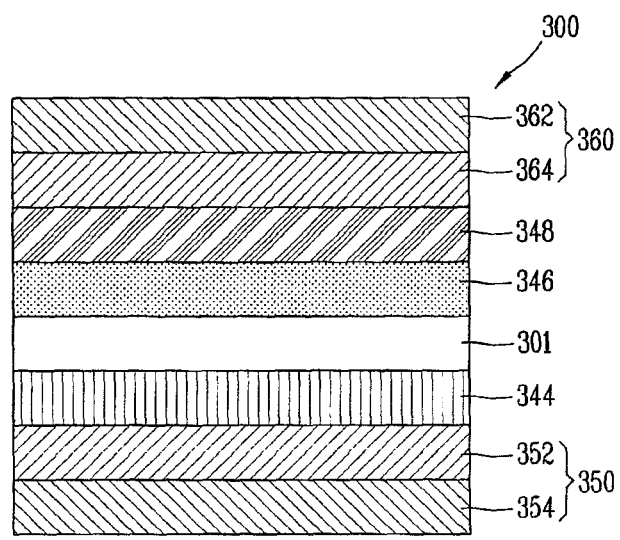
FIG. 13 is a view showing a structure of an LCD device in accordance with a second embodiment of the present invention.

FIG. 13 is a view showing a structure of an LCD device 300 in accordance with a second embodiment of the present invention. The LCD device of this embodiment is similar to the LCD device shown in FIG. 10 in its structure. That is, the LCD device of the second embodiment has the same structure as that of the LCD device of the first embodiment excluding addition of a negative C-film. Thus, the same configuration and functions as those in the first embodiment will be briefly described.

As shown in FIG. 13, an LCD device 300 according to the second embodiment may include an LC panel 301 for implementing images, a first compensation film 344 attached onto a lower portion of the LC panel 301, second and third compensation films 346 and 348 attached onto an upper portion of the LC panel 301, a first polarizer 350 attached onto a lower portion of the first compensation film 344, and a second polarizer 360 attached onto an upper portion of the third compensation film 348.

The first polarizer 350 may include a first polarizing body 352 and a first supporting body 254 formed of TAC, and the second polarizer 360 may include a second polarizing body 362 and a second supporting body 364.

The second compensation film 346 is a negative biaxial film, thus having a retardation value Re of 240~300 nm in a horizontal direction (i.e., Re=240~300 nm) and a retardation value Rth of 350~55 nm in a thickness direction (i.e., Rth=350~550 nm). Also, the third compensation film 348 is a positive biaxial film, thus having a retardation value Re of 240~300 nm in a horizontal direction (i.e., Re=240~300 nm) and a retardation value Rth of 50~0 nm in a thickness direction (i.e., Rth=50~0 nm). Hence, the second compensation film 346 is a negative biaxial film of which biaxiality Nz is in the range of 1.4<Nz<1.8, and the third compensation film 348 is a positive biaxial film of which biaxiality Nz is in the range of −4.8<Nz<0.

The first compensation film 344, as a negative C-film, is disposed between the first polarizer 350 and the LC panel 301. The negative C-film may typically be made of UV-curable perpendicularly-aligned liquid crystal film or a biaxially-stretched polymer film. Here, the negative C-film has a retardation value Rth of 20 nm~150 nm in the thickness direction (i.e., Rth=20 nm~150 nm(Re=0)).

An absorption axis of the first polarizer 350 is disposed at an angle of 90° and an absorption axis of the second polarizer 360 is disposed at an angle of 0°. Also, $n_x$ direction of the second compensation film 346 forms an angle of 90° and $n_x$ direction of the third compensation film 348 forms an angle of 0°. A rubbing direction of the LC panel 301 forms an angle of 90°.

Hereinafter, polarized states of the LCD device in accordance with the second embodiment of the present invention with such structure will be described with reference to FIGS. 14A to 14C.

Figure 14A:
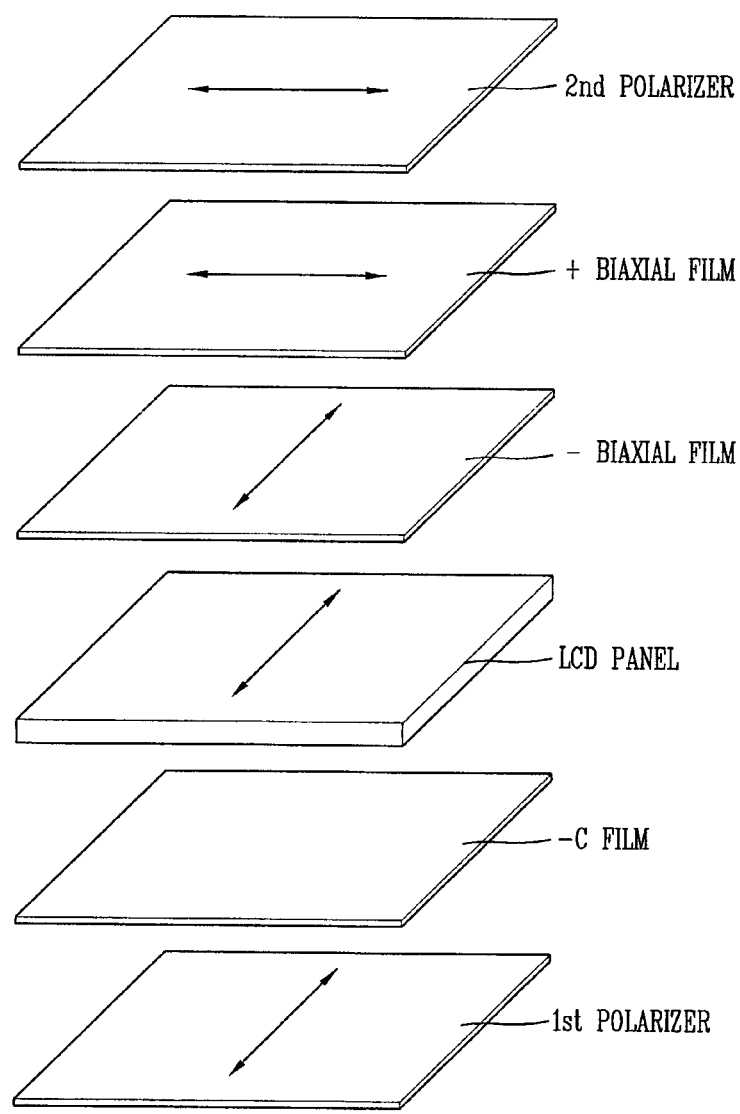
FIG. 14A an optical axis of the LCD device in accordance with the second embodiment of the present invention.

As shown in FIG. 14A, the first compensation film 344 implemented as a negative C-film is disposed between the first polarizer 350 and the LC panel 301. The second compensation film 346 implemented as a positive biaxial film is disposed between the LC panel 301 and the third compensation film 348. Here, $n_x$ direction of the second compensation film 346 is parallel to a light absorption axis of the first polarizer 350 and an alignment direction of the LC panel 301 (i.e., $n_x$ direction forms an angle of 90°). Also, the second polarizer 360 is disposed above the LC panel 301. Here, the light absorption axis of the second polarizer 360 is perpendicular to the rubbing direction of the LC panel 301 (i.e., the light absorption axis of the second polarizer 360 forms an angle of 0°). Moreover, the third compensation film 348 implemented as the positive biaxial film is located between the second compensation film 346 and the second polarizer 360, wherein $n_x$ direction of the third compensation film 348 is perpendicular to the rubbing direction of the LC panel 301 and parallel to the light absorption axis of the second polarizer 360 (i.e., $n_x$ direction forms an angle of 0°).

Figure 14B:
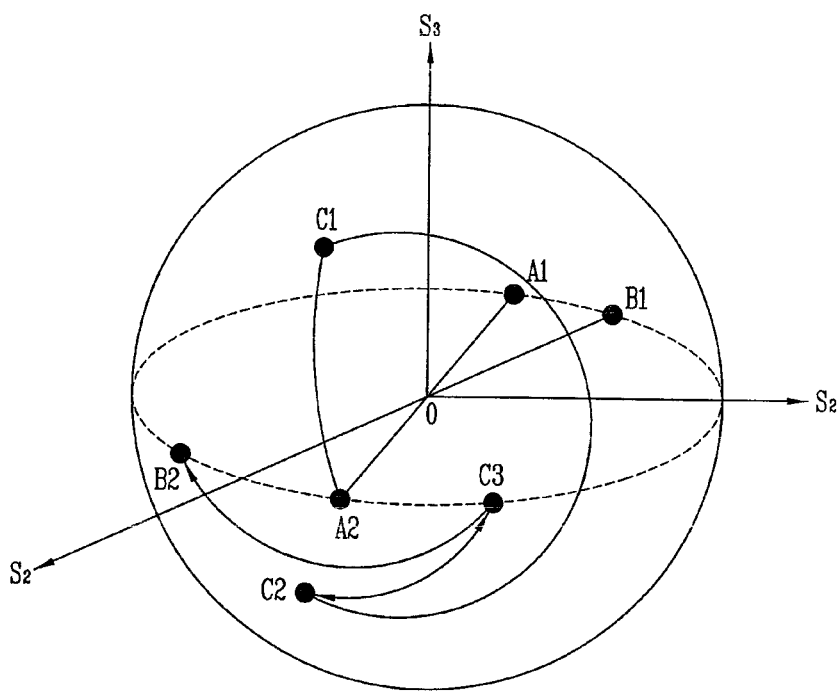
FIG. 14B is a view showing Poincare sphere in which light polarized states in the LCD device in accordance with the second embodiment of the present invention.

As shown in FIG. 14B, if non-polarized light is incident on the first polarizer 350 from the backlight of the LC panel 301, the light is linearly polarized, which is mostly absorbed at an absorption axis (point A1) of the first polarizer 350. The polarized state of the light transmitted through the first polarizer 350 is located at point A2. That is, a transmission axis of the first polarizer 350 is located at point A2. Here, the absorption axis of the second polarizer 360 is present at point B2, thus to be spaced apart from the transmission axis of the first polarizer 350 by a preset distance.

If the linearly-polarized light at the first polarizer 350 is transmitted through the first compensation film 344 implemented as the negative C-film, the polarized state is rotated in a clockwise direction based upon S1-axis so as to be moved from point A2 to point C1.

The light transmitted through the negative C-film 344 becomes elliptically polarized. If the elliptically polarized light is transmitted through the LC panel 301, because an alignment layer is in a rubbed state by an angle of 90°, the polarized state of the LC panel 301 is present at point A1. Therefore, the polarized state is rotated in a clockwise direction based upon A02-axis, so as to be moved from point C1 to point C2. Here, since a retardation value of the liquid crystal layer of the LC panel 301 is about 280 nm~350 nm, the light transmitted through the LC panel 301 is rotated in the clockwise direction at an angle of about 183°~229° based upon S2-axis. Even in this case, the light polarized state stays in the elliptically polarized state, which is located at the third or fourth quadrant of the Poincare sphere.

If the light transmitted through the LC panel 301 is then transmitted through the second compensation film 346 implemented as the negative biaxial film, the polarized state is rotated from point C2 to point C3. Here, because the second compensation film 346 is the negative biaxial film, the optical axis exists between $n_x$-axis and $n_z$-axis. Hence, the light polarized state is rotated in a counterclockwise direction based upon the optical axis between $n_x$-axis and $n_x$-axis so as to be moved from point C2 to point C3.

If the light transmitted through the second compensation film 346 is thereafter transmitted through the third compensation film 348 implemented as the positive biaxial film, the polarized state is rotated from point C3 to point B2. Here, because the second compensation film 348 is the positive biaxial film, the optical axis exists between $n_y$-axis and $n_x$-axis. Hence, the light polarized state is rotated in a clockwise direction based upon the optical axis between $n_y$-axis and $n_z$-axis so as to be moved from point C3 to point B2. Consequently, the light transmitted through the third compensation film 348 is changed to linearly-polarized light having the same polarization axis as the absorption axis of the second polarizer 360. The changed linearly-polarized light is then entirely absorbed by the second polarizer 360 so that no light can be transmitted through the second polarizer 360.

Figure 14C:
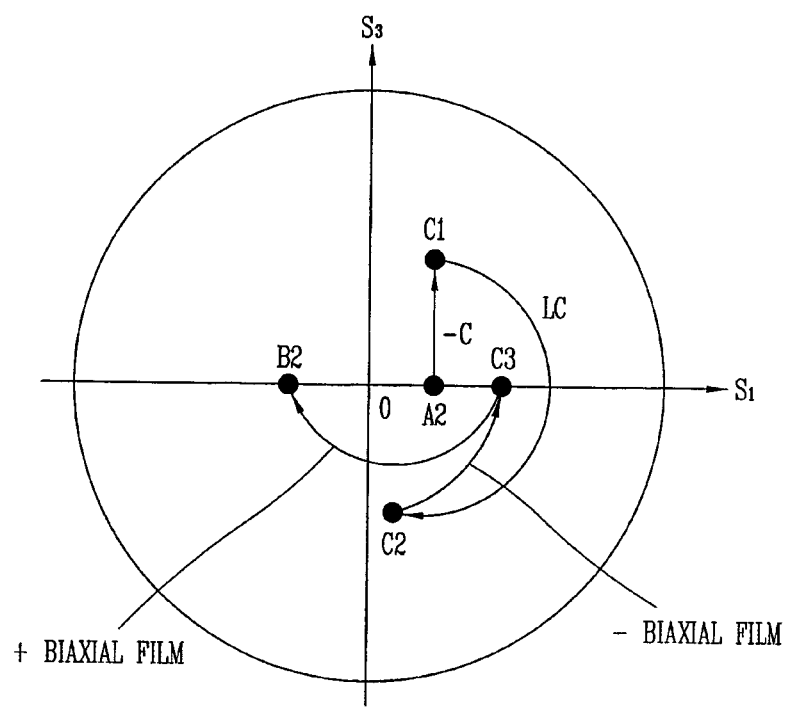
FIG. 14C is a protected view of FIG. 14B.

As shown in FIG. 14C, the polarized state (corresponding to point A2) of the linearly-polarized light at the first polarizer 350 is changed by the negative C-film 344, the LC panel 301 and the second compensation film 346, and finally matches with point B2 by virtue of the third compensation film 346, namely, the positive biaxial film. Accordingly, the optical axis of the light incident on the second polarizer 360 is consistent with the absorption axis of the second polarizer 360, such that the polarized light at the first polarizer 350 can entirely be absorbed by the second polarizer 360, thereby preventing light leakage in a diagonal direction.

Figure 15:
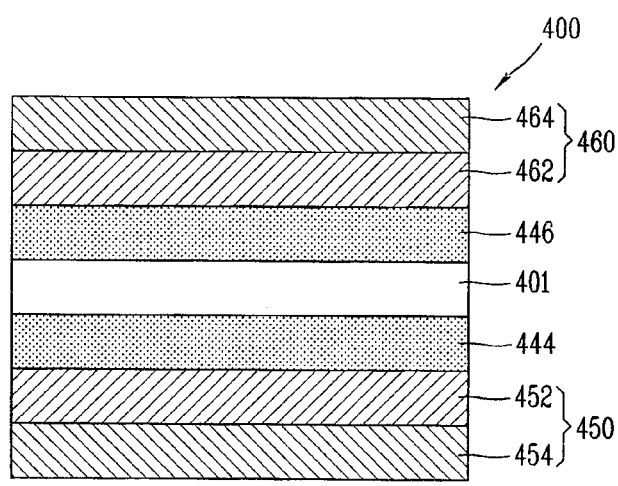
FIG. 15 is a view showing a structure of an LCD device in accordance with a third embodiment of the present invention.

FIG. 15 is a view showing a structure of an LCD device in accordance with a third embodiment of the present invention.

As shown in FIG. 15, an LCD device 400 in accordance with a third embodiment of the present invention may include an LC panel 401 for implementing images, a first compensation film 444 and a second compensation film 446 attached onto lower and upper portions of the LC panel 401, respectively, a first polarizer 450 attached onto a lower portion of the first compensation film 444, and a second polarizer 460 attached onto an upper portion of the second compensation film 446.

The first polarizer 450 is provided with a first polarizing body 452 and a first supporting body 454, and the second polarizer 460 is provided with a second polarizing body 462 and the second supporting body 464.

The first compensation film 444, as a uniaxial compensation film, is a negative A-film. Here, examples of the A-film may include cycloolefin polymer film, polycarbonate film, UV-curable horizontal or horizontally-aligned liquid crystal film, polystyrene resin and polyethylene terephthalate. A retardation value Re of the first compensation film 444 in a horizontal direction is in the range of −150~30 nm (a retardation value Rth in a thickness direction is 0 (Rth=0).

The second compensation film 446 is a positive biaxial compensation film, having a retardation value Re of 180~240 nm in a horizontal direction (i.e., Re=180~240 nm) and a retardation value Rth of −60 nm-0 nm in a thickness direction (i.e., Rth=−60 nm~0 nm). Hence, biaxiality Nz of a biaxial film of the second compensation film 446 is in the range of −3<Nz<0 according to Equation 5. Typically, if biaxiality Nz of a biaxial film is Nz<0, the biaxial film is a positive biaxial film, having a relation of $n_z>n_x>n_y$ among refractive indexes $n_x$, $n_y$, and $n_z$ in x, y and z-axial directions. Also, if biaxiality Nz of a biaxial film is in the range of 0<Nz<1, the biaxial film is a z-axis stretched biaxial film, having a relation of $n_x>n_z>n_y$ among the refractive indexes $n_x$, $n_y$, and $n_x$ in x, y and z-axial directions. The first compensation film 246 is a positive biaxial film having a biaxiality Nz of Nz<0.

An absorption axis of the first polarizer 450 is disposed at an angle of 90° and an absorption axis of the second polarizer 460 is disposed at an angle of 0°. Also, the refractive index $n_x$ in the x-axis of the first compensation film 444 is disposed at an angle of 0°. $n_x$ direction of the second compensation film 446 is disposed at an angle of 0° and a rubbing direction of the LC panel 401 also forms an angle of 90°.

Polarized states of the LCD device according to the third embodiment of the present invention having the structure will be described with reference to FIGS. 16A to 16C.

Figure 16A:
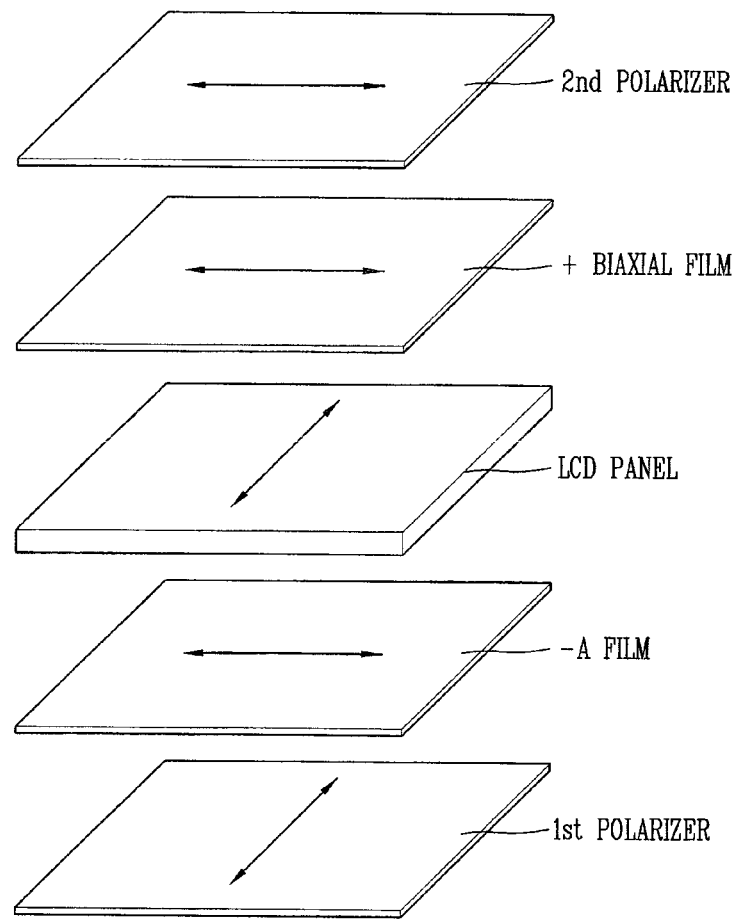
FIG. 16A is a view showing an optical axis of the LCD device in accordance with the third embodiment of the present invention.

As shown in FIG. 16A, the first compensation film 444 implemented as a negative A-film is disposed between the first polarizer 450 and the LC panel 401. Here, $n_x$ direction of the first compensation film 444 is perpendicular to a light absorption axis of the first polarizer 450 and a rubbing direction of the LC panel 401 (i.e., n, direction forms an angle of 0°). The second polarizer 460 is disposed above the LC panel 401, wherein a light absorption axis of the second polarizer 460 is perpendicular to the rubbing direction of the LC panel 401 (i.e., the light absorption axis of the second polarizer 460 forms an angle of 0°). Also, the second compensation film 446 implemented as a positive biaxial film is disposed between the LC panel 401 and the second polarizer 460. Here, $n_x$ direction of the second compensation film 446 is perpendicular to the rubbing direction of the LC panel 401 and parallel to the light absorption axis of the second polarizer 460 (i.e., $n_x$ direction forms an angle of 0°).

Figure 16B:
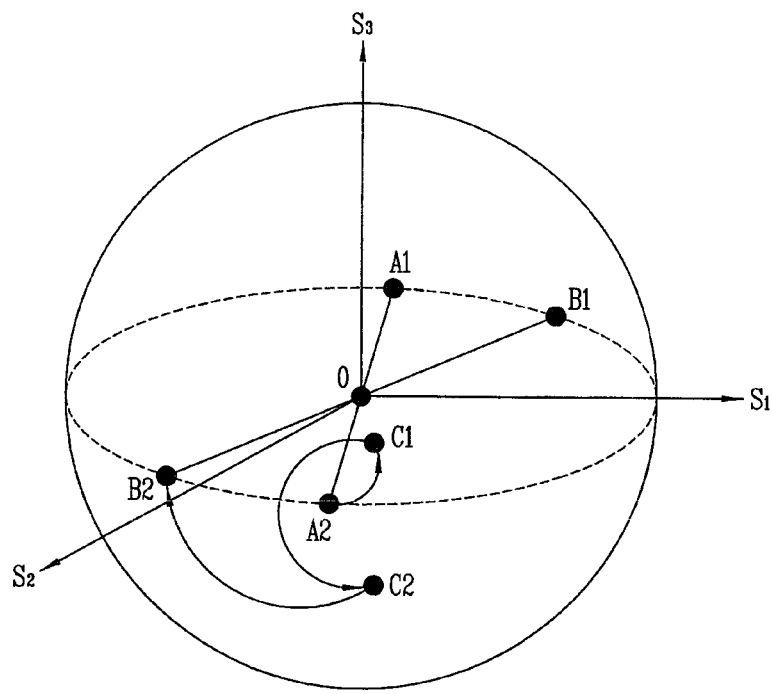
FIG. 16B is a view showing Poincare sphere in which light polarized states in the LCD device in accordance with the third embodiment of the present invention.

As shown in FIG. 16B, if non-polarized light is incident on the first polarizer 450 from a backlight of the LC panel 401, the light is linearly polarized. Most of the linearly polarized light is absorbed at an absorption axis (point A1) of the first polarizer 450. The polarized state of light transmitted through the first polarizer 450 is present at point A2. That is, a transmission axis of the first polarizer 450 is located at point A2. Here, the absorption axis of the second polarizer 460 is located at point B2, so as to be spaced apart from the transmission axis of the first polarizer 450 by a preset distance.

If the linearly-polarized light is transmitted through the first compensation film 444 implemented as the negative A-film, the polarized state is rotated in a counterclockwise direction based upon B20-axis, so as to be moved from point A2 to point C1.

Here, because a retardation value Re of the negative A-film 444 is in the range of 50~130 nm (i.e., Re=50~130 nm), a rotation angle of the negative A-film 444 is about 32.7°~85.1° with respect to green wavelength of 550 nm the wavelength affecting brightness. That is, the polarized state is rotated from point A2 in a counterclockwise direction by an angle of about 32.7°~85.1° based upon B20-axis, so as to be moved to point C1. Here, the point C1 is located on the first quadrant of the Poincare sphere, such that an elliptically-polarized state is maintained.

If the elliptically-polarized light is then transmitted through the LC panel 401, because an alignment layer is in a rubbed state by an angle of 90°, the polarized state of the LC panel 401 is present at point A1. Hence, the polarized state is rotated in a clockwise direction based upon A20-axis so as to be moved from point C1 to point C2. Here, since a retardation value of the LC layer of the LC panel 401 is about 280 nm~350 nm, the light transmitted through the LC panel 401 is rotated in a clockwise direction by an angle of about 183°~229° based upon A20-axis. Even in this case, the light-polarized state maintains the elliptically-polarized state located on the fourth quadrant of the Poincare sphere.

If the light transmitted through the LC panel 401 is then transmitted through the second compensation film 446 implemented as the positive biaxial film, the polarized state is rotated from point C2 to point B2. Here, because the second compensation film 446 is the positive biaxial film, its optical axis is present between $n_y$-axis and $n_z$-axis. Accordingly, the light-polarized state is rotated based upon the optical axis between $n_y$-axis and $n_z$-axis so as to be moved from point C2 to point B2. Consequently, the light transmitted through the second compensation film 446 is changed to linearly-polarized light having the same polarization axis as the absorption axis of the second polarizer 460. The changed linearly-polarized light is entirely absorbed by the second polarizer 460, such that no light can be transmitted through the second polarizer 460.

Figure 16C:
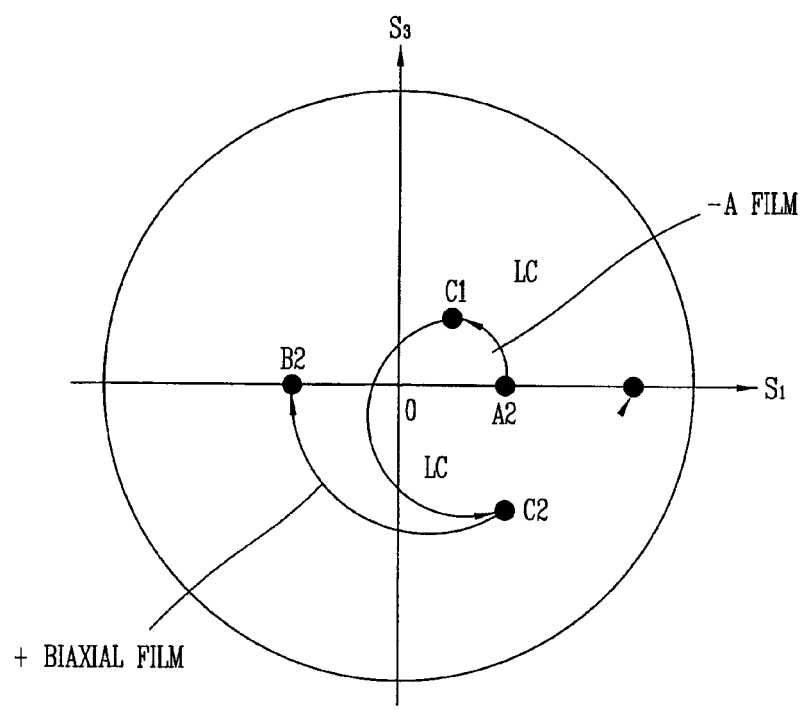
FIG. 16C is a protected view of FIG. 16B.

As shown in FIG. 16C, the polarized state (corresponding to A2) of the light linearly-polarized at the first polarizer 450 is changed by the negative A-film 444 and the LC panel 401, and consequently matches with point B2 by virtue of the positive biaxial film 446. Accordingly, the optical axis of the light incident on the second polarizer 460 is consistent with the absorption axis of the second polarizer 460 such that the polarized light at the first polarizer 450 can all be absorbed by the second polarizer 460, resulting in preventing light leakage in a diagonal direction.

Figure 17:
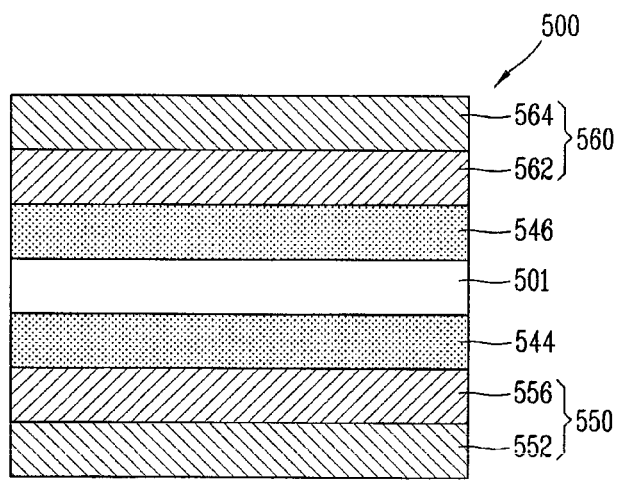
FIG. 17 is a view showing a structure of an LCD device in accordance with a fourth embodiment of the present invention.

FIG. 17 is a view showing a structure of an LCD device 500 in accordance with a fourth embodiment of the present invention. The LCD device of the fourth embodiment is similar to the LCD device of the third embodiment shown in FIG. 15 in its structure. That is, the LCD device of the fourth embodiment has the same structure as that of the LCD device of the third embodiment excluding addition of a supporting body 556 between a first compensation film 544 and a polarizing body 552. Thus, the same configuration and functions as those in the first embodiment will be briefly described.

As shown in FIG. 17, an LCD device 300 according to the fourth embodiment may include an LC panel 501 for implementing images, a first compensation film 544 attached onto a lower portion of the LC panel 501, a second compensation film 546 attached onto an upper portion of the LC panel 501, a first polarizer 550 attached onto a lower portion of the first compensation film 544, and a second polarizer 560 attached onto an upper portion of the second compensation film 546.

The first polarizer 550 may include a first polarizing body 552 and a first supporting body 556 formed of TAC without retardation Rth, and the second polarizer 560 may include a second polarizing body 562 and the second supporting body 564.

That is, the third embodiment is implemented such that the first supporting body 454 is formed outside the first polarizing body 452 and accordingly no supporting body is present between the first polarizing body 452 and the first compensation film 444 so that the first polarizing body 452 directly contacts the first compensation film 444, while the fourth embodiment is implemented such that the first supporting body 556 is disposed between the first polarizing body 552 and the first compensation film 544. Here, although a supporting body is not disposed outside the first polarizing body 552 in the drawing, a supporting body formed of TAC may also be disposed outside the first polarizing body 552.

In accordance with this embodiment having such configuration, as light transmits the LCD device 500, as shown in FIGS. 16B and 16C, the light polarized state is changed, and consequently the light polarized at the first polarizer 550 is entirely absorbed by the second polarizer 560, thereby preventing light leakage in a diagonal direction.

Figure 18:
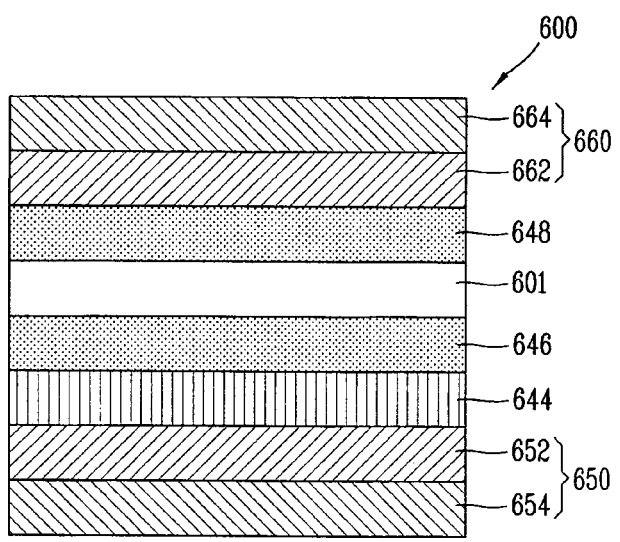
FIG. 18 is a view showing a structure of an LCD device in accordance with a fifth embodiment of the present invention.

FIG. 18 is a view showing a structure of an LCD device 600 in accordance with a fifth embodiment of the present invention.

As shown in FIG. 18, an LCD device 600 according to a fifth embodiment may include an LC panel 601 for implementing images, a first compensation film 644 disposed below the LC panel 601, a second compensation film 646 disposed between the first compensation film 644 and the LC panel 601, a third compensation film 648 attached onto an upper portion of the LC panel 601, a first polarizer 650 attached onto a lower portion of the first compensation film 644, and a second polarizer 660 attached onto an upper portion of the third compensation film 648.

The first polarizer 650 may include a first polarizing body 652 and a first supporting body 654 formed of TAC, and the second polarizer 660 may include a second polarizing body 662 and the second supporting body 664.

The first compensation film 644, as a negative C-film, is disposed between the first polarizer 650 and the LC panel 601. Here, examples of the C-film may include UV-curable perpendicularly-aligned liquid crystal film, biaxially-stretched polymer film and the like. A retardation value Rth of the C-film in a thickness direction is in the range of 20~150 nm (i.e., Re=20~150 nm(Re=0)).

The second compensation film 646 is a negative A-film. Here, examples of the A-film may include cycloolefin polymer film, polycarbonate film, UV-curable horizontal or horizontally-aligned liquid crystal film, polystyrene resin and polyethylene terephthalate. A retardation value Re of the second compensation film 646 in a horizontal direction is in the range of −150~−30 nm(Re=−150~−30 nm) (a retardation value Rth thereof in a thickness direction is 0 (Rth=0).

Also, because the third compensation film 648 is a positive biaxial compensation film, its retardation value Re in a horizontal direction is in the range of 180~240 nm and its retardation value Rth in a thickness direction is in the range of −60~0 nm Thus, biaxiality Nz of the biaxial film of the third compensation film 648 is in the range of −3<Nz<0. Therefore, the third compensation film 648 is a positive biaxial film having biaxiality Nz of Nz<0.

An absorption axis of the first polarizer 650 is disposed at an angle of 90° and an absorption axis of the second polarizer 660 is disposed at an angle of 0°. Also, $n_x$ direction of the second compensation film 646 is disposed at an angle of 0° and $n_x$ direction of the third compensation film 648 is disposed at an angle of 0°. Also, the rubbing direction of the LC panel 601 also forms an angle of 90°.

Polarized states of the LCD device according to the fifth embodiment of the present invention having the structure will be described with reference to FIGS. 19A to 19C.

Figure 19A:
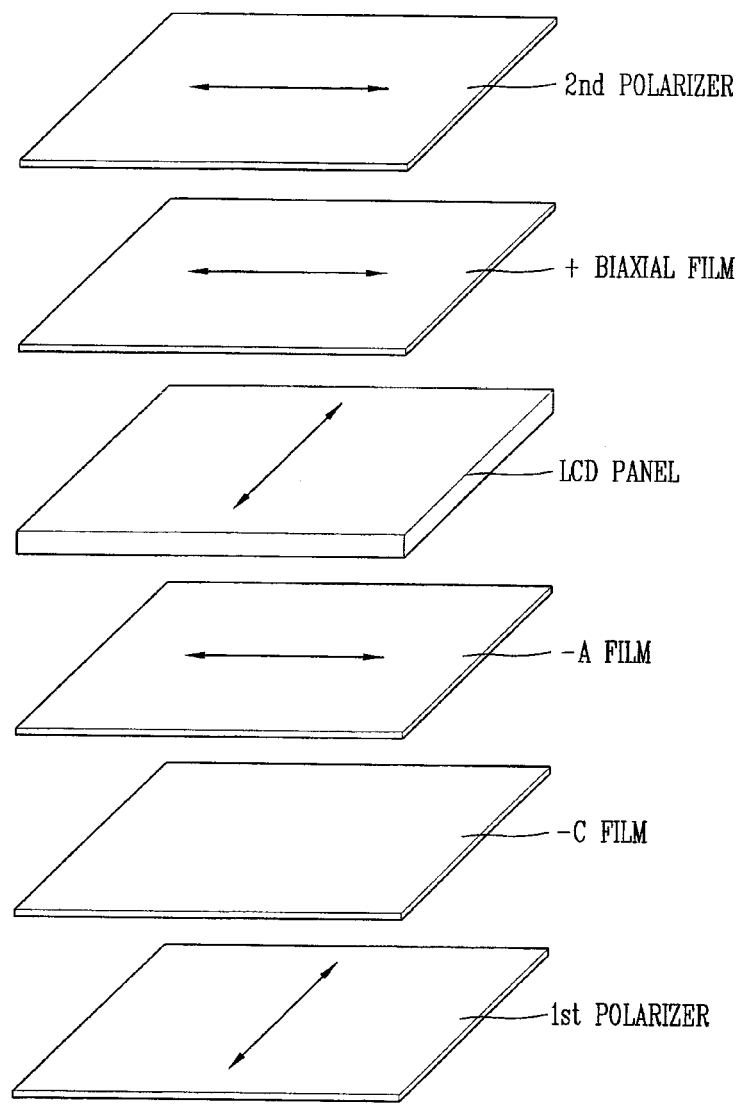
FIG. 19A is a view showing an optical axis of the LCD device in accordance with the fifth embodiment of the present invention.

As shown in FIG. 19A, the first compensation film 644 implemented as the negative C-film is disposed between the first polarizer 650 and the second compensation film 646, and also the second compensation film 646 implemented as the negative A-film is disposed between the first compensation film 644 and the LC panel 601. Here, $n_x$ direction of the second compensation film 646 is perpendicular to a light absorption axis of the first polarizer 650 and a rubbing direction of the LC panel 601 (i.e., $n_x$ direction forms an angle of 0°). The second polarizer 660 is disposed above the LC panel 601, wherein a light absorption axis of the second polarizer 660 is perpendicular to the rubbing direction of the LC panel 601 (i.e., the light absorption axis of the second polarizer 660 forms an angle of 0°). Also, the third compensation film 648 implemented as the positive biaxial film is disposed between the LC panel 601 and the second polarizer 660. Here, $n_x$ direction of the third compensation film 648 is perpendicular to the rubbing direction of the LC panel 601 and parallel to the light absorption axis of the second polarizer 660 (i.e., $n_x$ direction forms an angle of 0°).

Figure 19B:
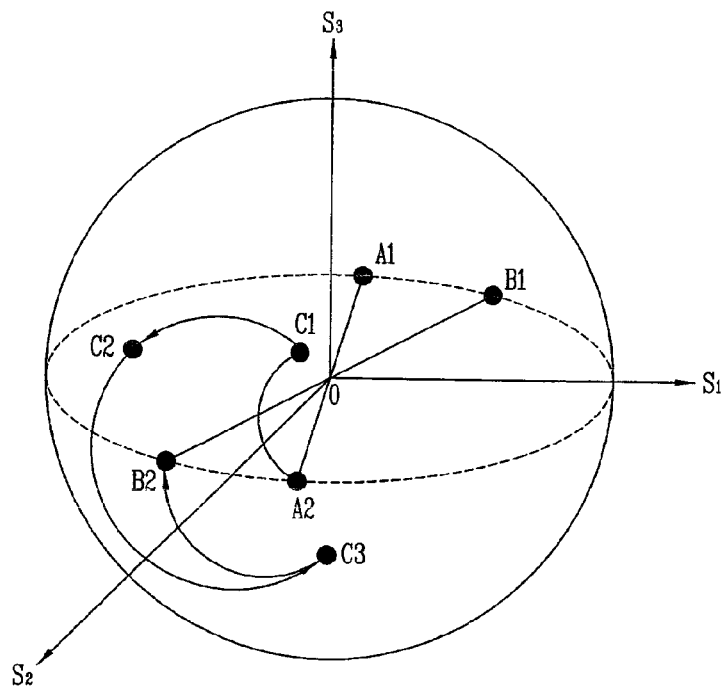
FIG. 19B is a view showing Poincare sphere in which light polarized states in the LCD device in accordance with the fifth embodiment of the present invention.

As shown in FIG. 19B, if non-polarized light is incident on the first polarizer 650 from a backlight of the LC panel 601, the light is linearly polarized. Most of the linearly polarized light is absorbed at an absorption axis (point A1) of the first polarizer 650. The polarized state of light transmitted through the first polarizer 650 is present at point A2. That is, a transmission axis of the first polarizer 650 is located at point A2. Here, the absorption axis of the second polarizer 660 is located at point B2, so as to be spaced apart from the transmission axis of the first polarizer 650 by a preset distance.

If the linearly-polarized light is transmitted through the first compensation film 644 implemented as the negative C-film, the polarized state is rotated in a clockwise direction based upon S1-axis, so as to be moved from point A2 to point C1.

The light transmitted through the negative C-film 644 becomes elliptically polarized. If the elliptically-polarized light is transmitted through the second compensation film 646 implemented as the negative A-film, the polarized state is rotated in a counterclockwise direction based upon B20-axis so as to be moved from point C1 to point C2.

Here, because a retardation value Re of the negative A-film 646 is 50~130 nm (i.e., Re=50~130 nm), a rotation angle of the negative A-film 644 is about 32.7°~85.1° with respect to green wavelength of 550~150~−30 nm the wavelength affecting brightness. That is, the polarized state is rotated from point C1 in a counterclockwise direction by an angle of about 32.7°~85.1° based upon B20-axis, so as to be moved to point C2. Here, the point C2 is located on the second quadrant of the Poincare sphere, such that an elliptically-polarized state is maintained.

If the elliptically-polarized light is then transmitted through the LC panel 601, because an alignment layer is in a rubbed state by an angle of 90°, the polarized state of the LC panel 601 is present at point A1. Hence, the polarized state is rotated in a clockwise direction based upon A20-axis so as to be moved from point C2 to point C3. Here, since a retardation value of the LC layer of the LC panel 601 is about 280 nm~350 nm the light transmitted through the LC panel 601 is rotated in a clockwise direction by an angle of about 183°~229° based upon A20-axis. Even in this case, the light-polarized state maintains the elliptically-polarized state located on the fourth quadrant of the Poincare sphere.

If the light transmitted through the LC panel 601 is then transmitted through the third compensation film 648 implemented as the positive biaxial film, the polarized state is rotated from point C3 to point B2. Here, because the third compensation film 648 is the positive biaxial film, its optical axis is present between $n_y$-axis and $n_z$-axis. Accordingly, the light-polarized state is rotated based upon the optical axis between $n_y$-axis and $n_z$-axis so as to be moved from point C3 to point B2. Consequently, the light transmitted through the third compensation film 648 is changed to linearly-polarized light having the same polarization axis as the absorption axis of the second polarizer 660. The changed linearly-polarized light is entirely absorbed by the second polarizer 660, such that no light can be transmitted through the second polarizer 660.

Figure 19C:
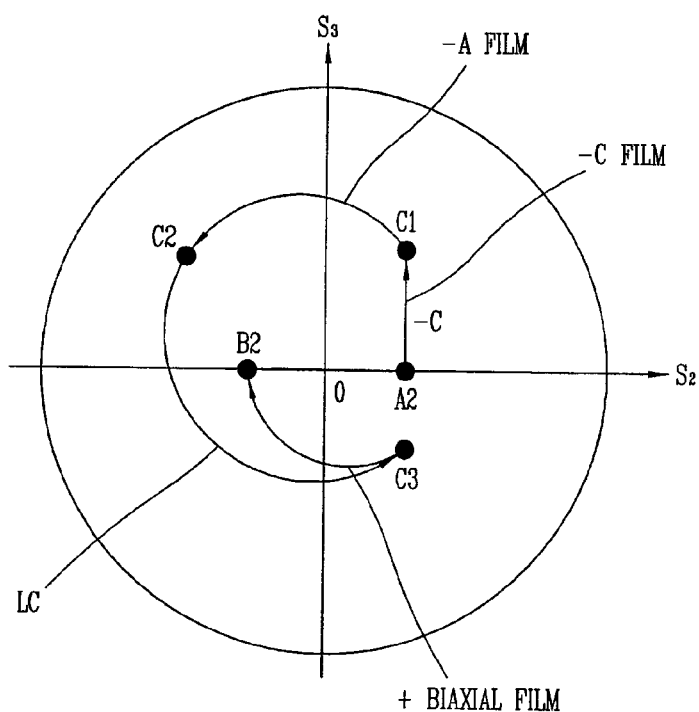
FIG. 19C is a protected view of FIG. 19B.

As shown in FIG. 19C, the polarized state (corresponding to A2) of the light linearly-polarized at the first polarizer 650 is changed by the negative C-film 644, the negative A-film 646 and the LC panel 601, and consequently matches with point B2 by virtue of the third compensation film 648, namely, the positive biaxial film. Accordingly, the optical axis of the light incident on the second polarizer 660 is consistent with the absorption axis of the second polarizer 660 such that the polarized light at the first polarizer 650 can all be absorbed by the second polarizer 660, resulting in preventing light leakage in a diagonal direction.

Figure 20A:
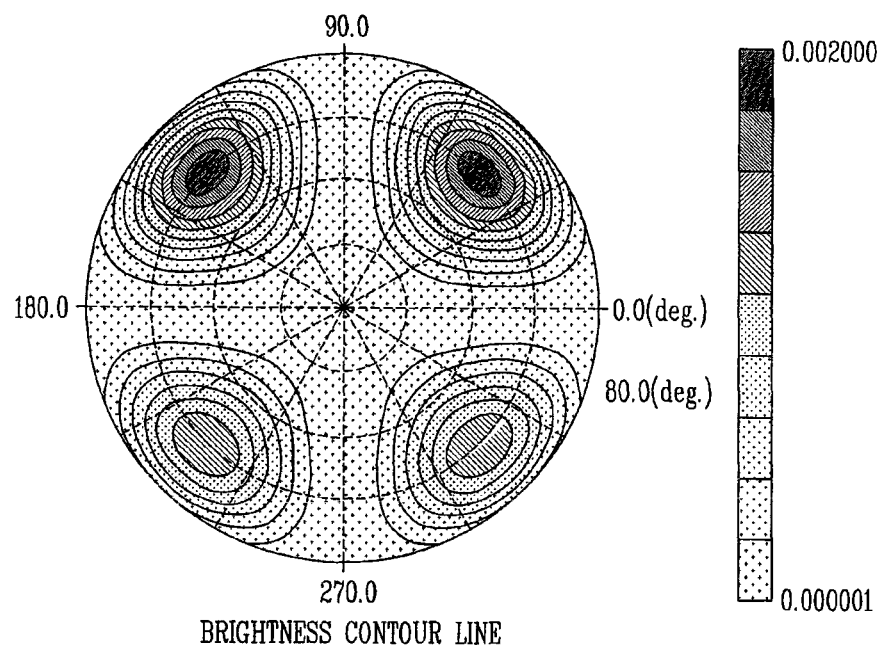
FIGS. 20A to 20C are views respectively showing viewing angle characteristics when viewing the related art LCD device and each LCD device according to the first and second embodiments of the present invention in a diagonal direction.
Figure 20B:
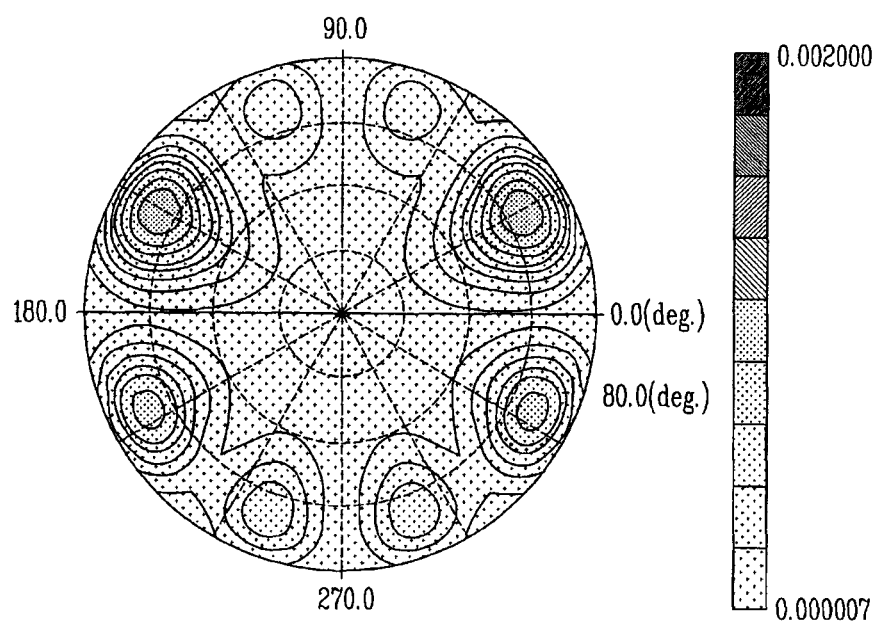
Figure 20C:
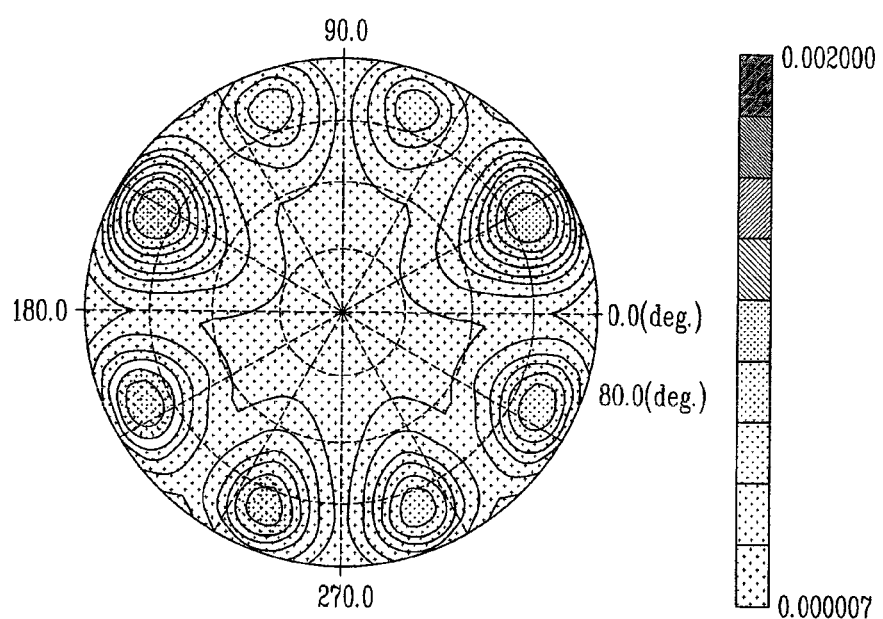

FIG. 20A shows the result of simulating a viewing angle characteristic in a normally black mode in a diagonally viewing direction of the related art LCD device, and FIGS. 20B and 20C show the results of simulating a viewing angle characteristic in a normally black mode in a diagonally viewing direction of each LCD device according to the first and second embodiments of the present invention.

Here, the lower polarizer and the upper polarizer are disposed such that light transmission axes thereof can be orthogonal to each other, and an optical axis of the liquid crystal layer is parallel with a light transmission axis of the lower polarizer. Here, FIGS. 20A to 20C are the results of simulating contrast characteristics, at an inclination angle in the range of 0~80° with respect to all radius vector angles (or azimuthal angles) when using white-tone light, for the related art LCD device and the LCD devices both having optical compensation films according to the present invention. In FIGS. 20A to 20C, a center of a circle may have an inclination angle of 0°. As a radius of the circle increases, the inclination angle becomes larger. Also, the numerals represented along a circumference denote radius vector angles.

Comparing the contrast characteristic of the related art LCD device shown in FIG. 20A with that of each LCD device according to the first and second embodiments of the present invention shown in FIGS. 20B and 20C, it can be observed that light leakage has been remarkably reduced at angles of 45°, 135°, 225° and 315° corresponding to the diagonal direction of the LC panel in the normally black mode. Here, a maximum transmittancy Tmax is 0.00192 (i.e., Tmax=0.00192) in the diagonal viewing angle direction of the related art LCD device, whereas the maximum transmittancy Tmax is 0.000288 (i.e., Tmax=0.000288) in the diagonal viewing angle direction of the LCD device having the negative biaxial film and the positive biaxial film according to the first embodiment of the present invention. The maximum transmittancy Tmax is 0.000351 (i.e., Tmax=0.000351) in the diagonal viewing angle direction of the LCD device having the negative C-film, the negative biaxial film and the positive biaxial film shown in FIG. 15c according to the second embodiment of the present invention. Therefore, it can be noticed that the transmittancy in the diagonal viewing angle direction of each LCD device according to the first and second embodiments of the present invention has been remarkably reduced as compared to the related art LCD device.

Figure 21A:
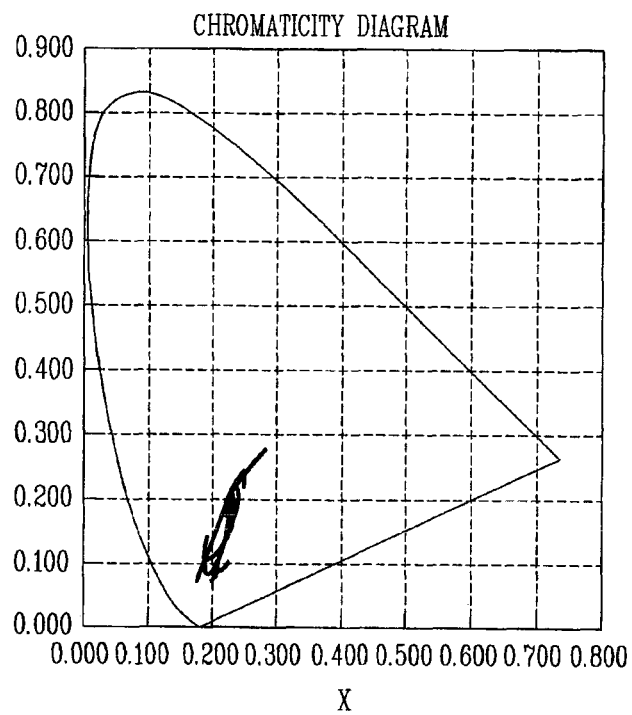
FIGS. 21A to 21C are views respectively showing chromaticity coordinates when viewing the related art LCD device and each LCD device according to the first and second embodiments of the present invention in a diagonal direction.
Figure 21B:
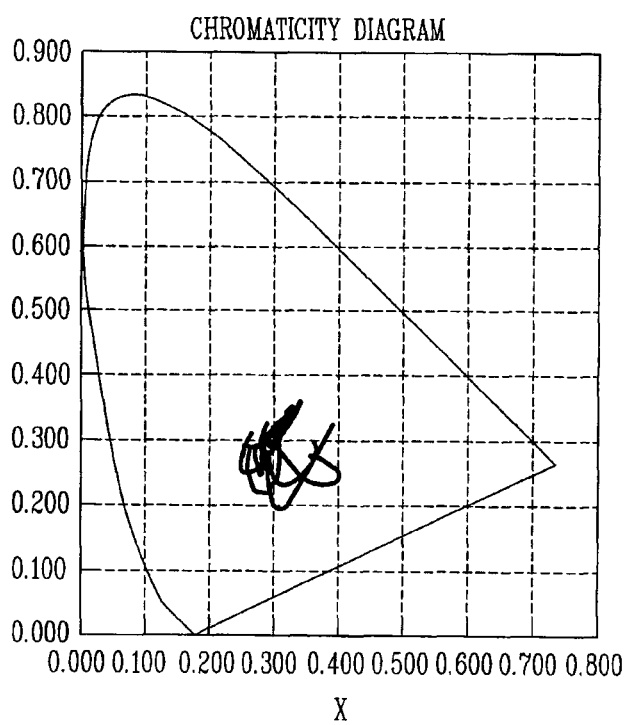
Figure 21C:
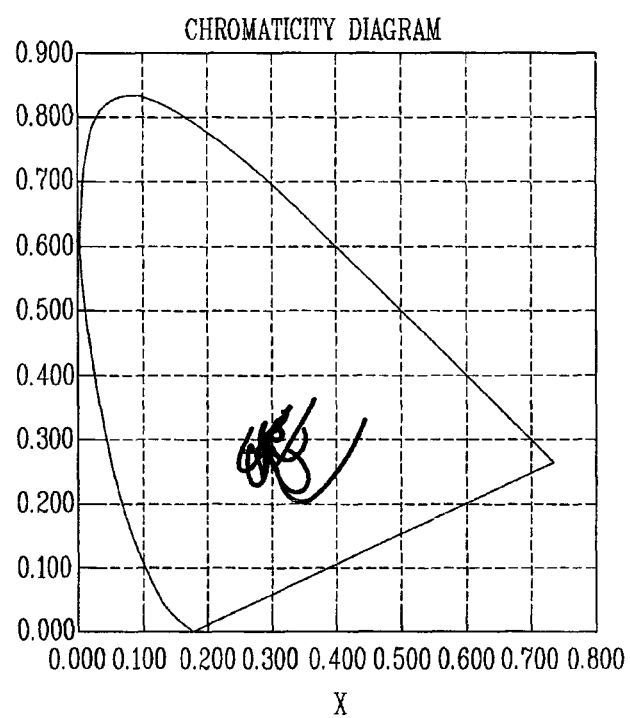

FIGS. 21A to 21C are chromaticity diagrams in a diagonally viewing direction of the related art LCD device and the LCD devices according to the first and second embodiments of the present invention. Here, FIGS. 21A to 21C are x and y chromaticity diagrams quantitatively representing all natural colors, each of which exhibits a color and saturation depending on a position relating to the chromaticity coordinates.

As shown in FIGS. 21A to 21C, x and y chromaticity coordinates of the related art LCD device are in the range of (0.18, 0.08) to (0.29, 0.28), whereas the x and y chromaticity coordinates of the LCD device according to the first embodiment are in the range of (0.25, 0.2) to (0.4, 0.36). Also, x and y chromaticity coordinates of the LCD device according to the second embodiment of the present invention are in the range of (0.26, 0.21) to (0.44, 0.36).

Hence, as compared to the related art LCD device, it can be seen that the ranges of the chromaticity coordinates in the first and second embodiments have moved toward a central region such that about 50% of color difference has decreased.

Figure 22A:
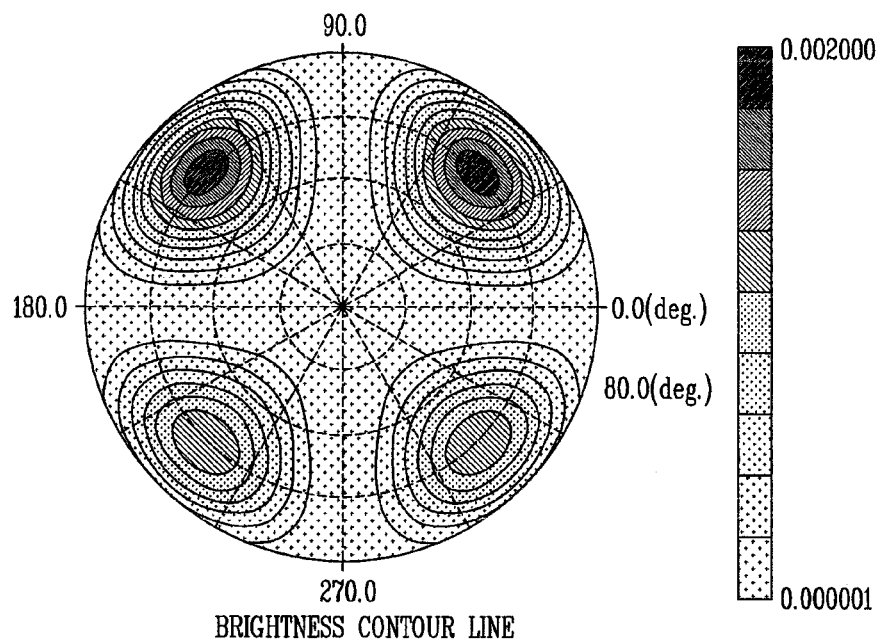
FIGS. 22A to 22C are views respectively showing viewing angle characteristics when viewing the related art LCD device and each LCD device according to the third and fifth embodiments of the present invention in a diagonal direction.
Figure 22B:
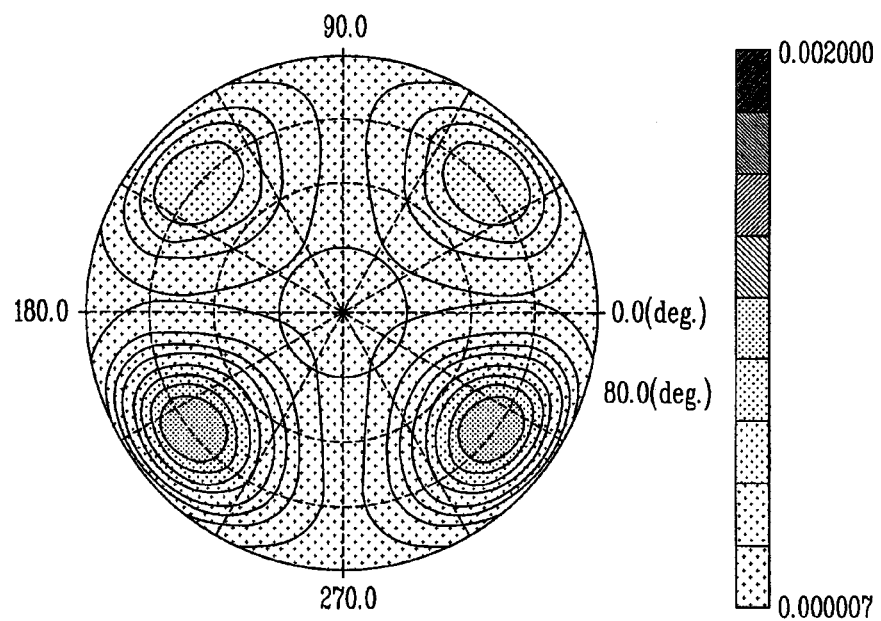
Figure 22C:
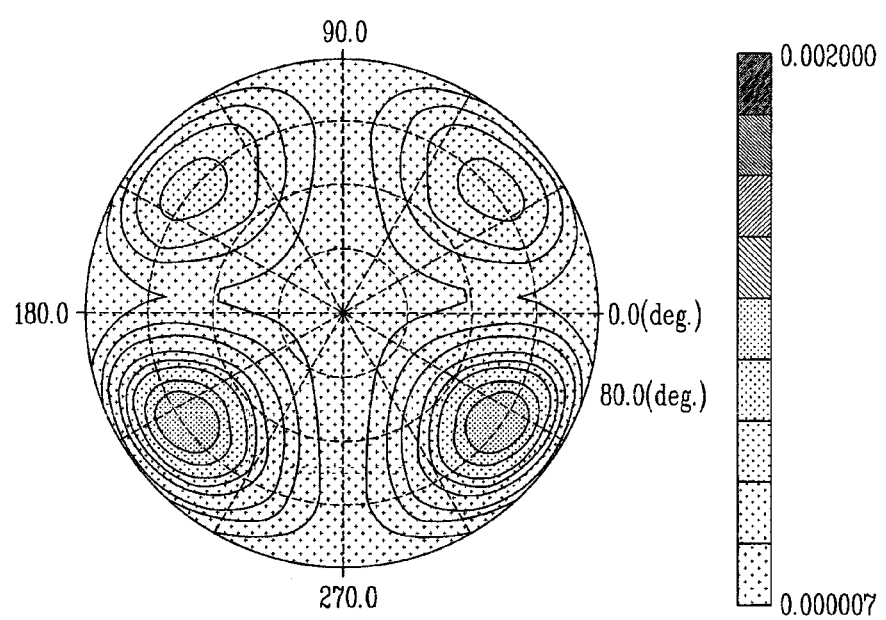

FIG. 22A shows the result of simulating a viewing angle characteristic in a normally black mode in a diagonally viewing direction of the related art LCD device, and FIGS. 22B and 22C show the results of simulating a viewing angle characteristic in a normally black mode in a diagonally viewing direction of each LCD device according to the third and fifth embodiments of the present invention.

Here, the lower polarizer and the upper polarizer are disposed such that light transmission axes thereof can be orthogonal to each other, and an optical axis of the liquid crystal layer is parallel with a light transmission axis of the lower polarizer. Here, FIGS. 22A to 22C are results of simulating contrast characteristics, at an inclination angle in the range of 0~80° with respect to all radius vector angles (or azimuthal angles) when using white-tone light, for the related art LCD device and LCD devices both having optical compensation films according to the fourth and fifth embodiments of the present invention. In FIGS. 22A to 22C, a center of a circle may have an inclination angle of 0°. As a radius of the circle increases, the inclination angle becomes larger. Also, the numerals represented along a circumference denote radius vector angles.

Comparing the contrast characteristic of the related art LCD device shown in FIG. 22A with that of each LCD device according to the third and fifth embodiments of the present invention shown in FIGS. 22B and 22C, it can be observed that light leakage has been remarkably reduced at angles of 45°, 135°, 225° and 315° corresponding to the diagonal direction of the LC panel in the normally black mode. Here, a maximum transmittancy Tmax is 0.00192 (i.e., Tmax=0.00192) in the diagonal viewing angle direction of the related art LCD device shown in FIG. 22A, whereas the maximum transmittancy Tmax is 0.000221 (i.e., Tmax=0.000221) in the diagonal viewing angle direction of the LCD device having the negative A-film and the positive biaxial film shown in FIG. 16B according to the third embodiment of the present invention. Also, the maximum transmittancy Tmax is 0.000301 (i.e., Tmax=0.000301) in the diagonal viewing angle direction of the LCD device having the negative C-film, the negative A-film and the positive biaxial film shown in FIG. 19B according to the fifth embodiment of the present invention. Therefore, it can be noticed that the transmittancy in the diagonal viewing angle direction of each LCD device according to the third and fifth embodiments of the present invention has been remarkably reduced as compared to the related art LCD device.

Meanwhile, light having its polarized state changed while it is incident on a first polarizer to be transmitted through an LC layer, a negative biaxial film and a positive biaxial film can all be absorbed by a light absorption axis of a second polarizer such that no light is transmitted through the second polarizer in a normally black mode; however, its reverse configuration can also achieve the same effect. That is, a light-polarized state is changed while light is incident on the second polarizer to be transmitted through the positive biaxial film negative biaxial film and the LC layer such that no light is transmitted through the first polarizer.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device comprising:
a liquid crystal display panel having a liquid crystal layer;
a first polarizer and a second polarizer located below and above the liquid crystal display panel, respectively, to polarize light;
a negative A-film provided between the liquid crystal display panel and the first polarizer to change a light polarized state, the negative A-film having a retardation value Re of −150~30 nm in a horizontal direction and a retardation value Rth of 0 nm in a thickness direction; and
a positive biaxial film provided between the liquid crystal display panel and the second polarizer to change a light polarized state, and the positive biaxial film having a retardation value Re of 180~240 nm in a horizontal direction and a retardation value Rth of −60~0 nm in a thickness direction,
wherein Re=$(n_x-n_y)d$, Rth=$(n_x-n_z)d$, and $n_x$, $n_y$ and $n_z$ denote refractive indexes of x, y and z-axial directions, respectively.

2. The device of claim 1, wherein absorption axes of the first polarizer and the second polarizer are perpendicular to each other.

3. The device of claim 1, wherein the first polarizer comprises:
a first supporting body; and
a first polarizing body having one surface attached onto the first supporting body.

4. The device of claim 3, wherein the first supporting body is a transparent protection film.

5. The device of claim 4, wherein the transparent protection film is made of triacetylcellulose.

6. The device of claim 3, wherein the first polarizing body is made of polyvinyl alcohol based resin.

7. The device of claim 3, wherein the first polarizer comprises:
a first polarizing body; and
a first supporting body disposed between the first polarizer and the negative A-film, the first supporting body being made of zero retardation triacetylcellulose.

8. The device of claim 1, wherein the second polarizer comprises:
a second supporting body; and
a second polarizing body having one surface attached onto the second supporting body.

9. The device of claim 8, wherein the second supporting body is a transparent protection film.

10. The device of claim 9, wherein the transparent protection film is made of triacetylcellulose.

11. The device of claim 8, wherein the first polarizer is made of polyvinyl alcohol based resin.

12. The device of claim 1, wherein the negative A-film is made of a material selected from a group consisting of cycloolefin polymer film, polycarbonate film, UV-curable horizontal or horizontally-aligned liquid crystal film, polystyrene resin and polyethylene terephthalate.

13. The device of claim 1, wherein the positive biaxial film is made of a material selected from a group consisting of UV-curable liquid crystal film, polycarbonate, polyethylene terephthalate, polystyrene, uniaxially-stretched triacetylcellulose (TAC), uniaxially-stretched polynorbonene (PNB), biaxially-stretched polycarbonate (PC), biaxially-stretched COP, biaxial liquid crystal (LC) film.

14. The device of claim 1, wherein $n_x$ direction of the negative A-film is perpendicular to a light absorption axis of the first polarizer, and $n_x$ direction of the positive biaxial film is parallel to a light absorption axis of the second polarizer.

15. The device of claim 1, wherein a rubbing direction of the liquid crystal display panel is parallel to a light absorption axis of the first polarizer.

16. The device of claim 1, further comprising a negative C-film provided between the first polarizer and the liquid crystal display panel to change a light-polarized state, the negative C-film having a retardation value Re of 0nmin a horizontal direction and a retardation value Rth of 20~150 nm in a thickness direction.

17. The device of claim 1, wherein non-polarized light is incident on the first polarizer.

18. The device of claim 1, wherein non-polarized light is incident on the second polarizer.

19. The device of claim 1, wherein the LC Panel is an In Plane switching (IPS) mode liquid crystal display panel or a Fringe Field Switching (FFS) mode liquid crystal display panel.

* * * * *